United States Patent
Boone et al.

(10) Patent No.: US 7,208,050 B2
(45) Date of Patent: *Apr. 24, 2007

(54) DIRECT DRIVE INDUSTRIAL CARPET CLEANER

(75) Inventors: Wayne Eric Boone, Marysville, WA (US); Michael Connor Palmer, Edmonds, WA (US)

(73) Assignee: Hydramaster Corporation, Mukilteo, WA (US)

( * ) Notice: Subject to any disclaimer, the term of this patent is extended or adjusted under 35 U.S.C. 154(b) by 194 days.

This patent is subject to a terminal disclaimer.

(21) Appl. No.: 10/329,227

(22) Filed: Dec. 23, 2002

(65) Prior Publication Data

US 2004/0117939 A1 Jun. 24, 2004

(51) Int. Cl.
*A47L 11/30* (2006.01)

(52) U.S. Cl. .............................. 134/21; 15/320; 15/321

(58) Field of Classification Search .......... 15/320–321, 15/340.1, 340.2, 340.3, 340.4; 134/21; 74/609; 403/355, 356, 359.1, 359.5, 301; 464/177, 464/182

See application file for complete search history.

(56) References Cited

U.S. PATENT DOCUMENTS

| | | | | |
|---|---|---|---|---|
| 55,198 A | * | 5/1866 | Baum | 403/306 |
| 1,410,913 A | * | 3/1922 | Grey | 134/7 |
| 1,554,755 A | * | 9/1925 | Parsons | 464/30 |
| 1,673,529 A | * | 6/1928 | Ponselle | 15/320 |
| 2,121,649 A | * | 6/1938 | Beitman | 15/50.1 |
| 2,726,522 A | * | 12/1955 | Gumpper et al. | 464/177 |
| 2,844,840 A | * | 7/1958 | Gray | 15/321 |
| 3,696,689 A | * | 10/1972 | Senter et al. | 74/609 |
| 3,964,449 A | | 6/1976 | Thien et al. | 123/41.51 |
| 3,995,603 A | | 12/1976 | Thien et al. | 123/41.51 |
| 4,227,893 A | | 10/1980 | Shaddock | 55/97 |
| 4,534,746 A | * | 8/1985 | Hausinger | 464/170 |
| 4,692,053 A | | 9/1987 | Sampedro | 403/24 |
| 4,773,119 A | * | 9/1988 | Duthie et al. | 15/340.1 |
| 4,862,551 A | | 9/1989 | Martinez et al. | 15/321 |
| 5,165,139 A | | 11/1992 | Oxman | 15/321 |
| 5,218,737 A | | 6/1993 | Dansby et al. | 15/347 |
| 5,371,918 A | | 12/1994 | Shero | 15/321 |
| 5,430,910 A | * | 7/1995 | Wiley | 15/321 |
| 5,596,788 A | | 1/1997 | Linville et al. | 15/352 |
| 5,815,869 A | | 10/1998 | Hopkins | 8/158 |
| 5,950,273 A | | 9/1999 | Suhaka et al. | 15/326 |
| 6,675,437 B1 | * | 1/2004 | York | 15/321 |
| 2005/0278889 A1 | * | 12/2005 | Hayes et al. | 15/321 |

* cited by examiner

*Primary Examiner*—Terrence R. Till
(74) *Attorney, Agent, or Firm*—Charles J. Rupnick, Attorney at Law

(57) ABSTRACT

An interface assembly for interconnecting respective housings and output and input drive shafts of a power plant and a vacuum blower by hard mounting, the interface assembly including: an adapter plate secured to a housing of the power plant in rigid and rotationally fixed contact therewith at an output drive shaft thereof; a rigid metal casting interfaced to the adapter plate on the power plant in rigid and rotationally fixed contact therewith, the rigid metal casting further interfaced to a housing of the vacuum blower in rigid and rotationally fixed contact therewith at an input drive shaft thereof; and a rigid coupler assembly interfaced in rigid and rotationally fixed contact to each of the output and input drive shafts for transferring power from the power plant output drive shaft to the vacuum blower input drive shaft.

81 Claims, 11 Drawing Sheets

DIRECT DRIVE INDUSTRIAL CARPET CLEANER

FIELD OF THE INVENTION

The present invention relates to drive devices and methods in industrial carpet and floor cleaning devices, and in particular to rigid couplings in an professional carpet cleaner drive system.

BACKGROUND OF THE INVENTION

Industrial floor cleaning systems generally provide for the management of heat, vacuum, pressure, fresh and gray water, chemicals, and power to achieve the goal of efficient, thorough cleaning of different substrates, usually carpets but also hard flooring, linoleum and other substrates, in both residential and commercial establishments. Professional substrate cleaning systems are also utilized in the restoration industry for water extraction.

Of the many industrial substrate cleaning systems available, a major segment are self-contained having an own power plant, heat source, vacuum source, chemical delivery system, and water dispersion and extraction capabilities. These are commonly referred to as "slide-in" systems and install permanently in cargo vans, trailers and other commercial vehicles, but can also be mounted on portable, wheeled carts. Slide-in systems comprise a series of components designed and integrated into a package with an overall goal of performance, economy, reliability, safety, useful life, serviceability, and sized to fit in various commercial vehicles.

FIG. 1 schematically illustrates a state-of-the-art industrial slide-in substrate cleaning system 1 (shown without scale) for carpets, hard flooring, linoleum and other substrates, one well-known example of which is the self-contained, gas-powered, truck-mounted model CTS-450 that is commercially available from Hydramaster Corporation, Mukilteo, Wash.

FIG. 1 illustrates the components of a conventional slide-in carpet cleaner system 1 structured around a frame or structural platform 2 onto which the majority of the components are mounted. The slide-in 1 includes a drive system 3 mounted on the platform 2 and having a power plant 4 coupled to receive fuel from an appropriate supply, a vacuum blower 5 that is the vacuum source for removing soiled water from the cleaned substrate, either carpet or other flooring, and an interface assembly 6 for transmitting power from the power plant to the vacuum blower. A standard truck battery 7 is provided as a source of electric energy for starting the engine. An intake hose 8 is coupled to a source of fresh water, and a water pump or air compressor 9 driven by the power plant via V-belt (shown), direct drive, or otherwise for pressurizing the fresh water. One or more heat exchangers and associated plumbing 10 is coupled for receiving the pressurized fresh water and heating it. A recovery tank 11 is provided wherein gray water is stored after removal from the cleaned surface. A high pressure solution hose 12 is provided for delivering pressurized, hot water/chemical solution from the machine via a wand or power head to the substrate to be cleaned, usually a carpet or hard flooring, and a chemical container 13 or other chemical system is coupled for delivering a stream of cleaning chemical into hot water as it enters the high-pressure solution hose. A wand or power head 14 is coupled to the high pressure solution hose 12 for receiving and dispersing the pressurized hot water/chemical cleaning solution to the carpet. The wand or power head 14 is the only "portable" part of truck-mount slide-in professional carpet cleaning systems in that it is removed from the vehicle and carried to the carpet or other substrate to be cleaned, and it is the only equipment that makes physical contact with the carpet to be cleaned. A vacuum hose 15 is coupled to the wand or power head 14 for recovering the soiled water-based chemical cleaning solution from the cleaned surface via the wand or power head and delivering it to the recovery tank.

The slide-in system 1 operates by delivering fresh water to an inlet to the system, utilizing either a standard garden hose or a fresh-water container. The system adds energy to the fresh water, i.e., pressurizes it, by means of the pump or air compressor 9. The fresh water is pushed throughout the heat exchanger apparatus and associated plumbing 10 using pressure provided by either the pump or air compressor. The heat exchangers gain their heat by thermal energy rejected from the power plant 4, e.g., from hot exhaust gasses, coolant water used on certain engines, or another known means. On demand from the wand or power head 14, the heated fresh water is mixed with chemicals as the hot water is exiting the machine and entering the high-pressure hose 12. The hot water travels typically, but not limited to, between 50 feet to 300 feet to the wand or power head 14. The operator delivers the hot solution via the wand or power head 14 to the carpet or other surface to be cleaned and almost immediately extracts it along with soil that has been emulsified by thermal energy or dissolved and divided by chemical energy. The extracted, soiled water is drawn via the vacuum hose 15 into the recovery tank 11 for eventual disposal as gray water.

FIG. 2 illustrates the drive system 3 of an industrial carpet cleaner as having several components. Three crucial parts of this drive system 3 are a power plant 4, such as an engine, a vacuum blower 5, and an interface assembly 6 that transmits power from the power plant 4 to the vacuum blower 5. The power plant 4 is, for example, any steam, electric or internal combustion motor, such as a gasoline, diesel, alcohol, propane, or otherwise powered internal combustion engine.

As FIG. 2 illustrates, the power plant or engine 4 and vacuum blower 5 of a current state-of-the-art industrial carpet cleaner drive system 3 are independently metal-to-metal hard-mounted on a sturdy metal support frame 2 either directly (shown for vacuum blower 5) using multiple mechanical fasteners 16, e.g., bolt or screws, or using sturdy metal brackets 17 and fasteners 16 (shown for power plant 4). The metal support frame 2 is used for mounting in a van, truck or another suitable vehicle for portability, as illustrated in FIG. 1. Optionally, the support frame is wheeled (as shown) for portability independent of the vehicle. The professional carpet cleaning industry currently uses one of two different interface assemblies 6 for transmitting power from the power plant 4 to the vacuum blower 5: either a belt drive system or a coupling drive system (shown).

The belt drive system (not shown) transmits power through pulleys and belts, which suffer inherent problems of wear and breakage. Belt slippage and loss of tension result in lost power and efficiency. Belt drives typically fail catastrophically, thus causing the end-user down-time. Also, fast moving belt drives are safety hazards requiring installation of protective guards. Since some protective guards can be removed by an end-user, safety hazards cannot be completely eliminated.

The coupling drive system transmits power from the power plant output or drive shaft 18 directly to the vacuum blower input or drive shaft 19 through one of several known coupling means.

A problem common to both belt and coupling drive systems is misalignment of the drive components. In belt drives, pulleys attached to the engine and vacuum blower drive shafts require strict alignment to ensure proper operation of the belts and maximum efficiency. In coupling drives, even slight lateral and angular misalignments of the respective power output and input drive shafts result in vibration, gear chatter, high wear rates, and ultimately catastrophic failure.

FIGS. 3A and 3B illustrate a known C-Face coupling 20 useful as the interface assembly 6 for forming a direct drive joint between the power plant output drive shaft 18 and the vacuum blower input drive shaft 19. FIG. 3A is perspective view of the C-Face coupling 20 showing the power plant output drive shaft 18 and the vacuum blower input drive shaft 19 joined and rotationally fixed to respective inwardly facing hubs 22, 24. The two hubs 22, 24 are both joined and rotationally fixed to a center section 26 of the C-Face coupling 20 by multiple fasteners 28 between respective cooperating flanges 30, 32 and 34, 36. Torque generated by the power plant 4 and output through drive shaft 18 is thus transmitted through the C-Face coupling 20 and input to the vacuum blower 5 through its drive shaft 19.

FIG. 3B is a cross-section through the C-Face coupling 20 illustrated in FIG. 3A and shows elongated portions 38, 40 of the respective hubs 22, 24 having the respective power plant and vacuum blower drive shafts 18, 19 extending therethrough. The elongated portions hub portions 38, 40 are shown extending inside a bore through the center section 26. The C-Face coupling 20 is alternatively expanded as necessary by reversing either of the hubs 22, 24 such that its respective elongated portion 38, 40 is outside the center section 26.

Multiple clearance holes 42 through the wall of the center section 26 permit access to install multiple pins or set screws (shown) 44 through the walls of the elongated hub portions 38, 40 for clamping and rotationally fixing the output and input drive shafts 18, 19 relative to the respective hubs 22, 24.

When operated with the independent mounting of the drive system components currently used in professional carpet cleaners, the traditional belt and coupling drive systems must rely on the metal frame 2 to provide and maintain the precise alignment required of the vacuum blower 5 relative to the power plant 4. Given the difficulty of achieving and maintaining such precise vacuum blower to power plant alignment, the metal frame 2 is necessarily a heavy and rigid structure to absorb and minimize significant vibrations resulting from imprecise alignment.

Furthermore, when under load, e.g., when the carpet wand 14 is engaged firmly to the carpet providing for maximum vacuum seal, the vacuum blower 5 produces an asymmetric radial shock pulse along its driven shaft 19. These shock pulses produce a cyclic eccentric load that, in an improperly aligned C-Face drive system exacerbates any misalignment and further increases wear, thereby decreasing the coupling's useful life.

One attempt to reduce the effects of imprecise alignment involves inserting elastomeric vibration dampeners at the interface between the power plant output and the vacuum blower input. For example, neoprene pads 46 are provided between the hub and center section flanges 30, 32 and 34, 36 of the C-Face coupling 20 to dampen vibrations due to slight lateral and angular misalignments of the power plant and vacuum blower drive shafts 18, 19. Alternatively, neoprene plugs or bushings 48 are provided at each of the fasteners 28 joining the flanges 30, 32 and 34, 36. Unfortunately, the C-Face coupling is known to lose efficiency through vibration of the neoprene pads 46 and bushings 48, which also absorb the torque impact output at the output drive shaft 18.

FIGS. 4A, 4B and 4C illustrate other means of reducing the effects of imprecise alignment by embodying the interface assembly 6 as a flexible coupling. FIG. 4A is a perspective view illustrating a known flexible coupling, the "Waldron" coupling, 50 that uses two hubs 52, 54 structured for positive mounting on the respective engine and blower shaft 18, 19. External splines 56, 58 on respective the hubs are engaged by generated internal splines 60, 62 cut on a bore of a casing or sleeve 64. The external or internal splines 56, 58 or 60, 62 may be formed of an elastomer, such as neoprene or nylon, for absorbing vibrations and impacts due to fluctuations in shaft torque or angular speed. Such flexible couplings, however, also lose efficiency through vibration of the elastomer when the external or internal splines are formed of neoprene or nylon to reduce the effects of imprecise alignment.

FIG. 4B is a partial cut-away side view and FIG. 4C is an end-on section view that together illustrate the interface assembly 6 embodied as a known "Fast" flexible coupling 80 that consists of two hubs 82, 84 each keyed to its respective engine and blower shaft 18, 19. Each hub 82, 84 has generated splines 86 cut at a distance from the end of the respective power plant and vacuum blower drive shaft 18, 19. A casing or sleeve 88 is split transversely and is fitted to surround the hubs 82, 84 where it is bolted by means of flanges 90, 92. Each half of the sleeve has generated internal splines 94 cut on its bore at the end opposite to the flange. The internal splines 94 permit a definite error of alignment between the two shafts.

Other known flexible couplings for transmitting power from the engine to the vacuum blower include the chain coupling that uses either silent chain or standard roller chain with the mating sprockets; and steelflex couplings having two grooved steel hubs keyed to the respective shafts, connection between the two halves being secured by a specially tempered alloy-steel member called the "grid."

In a known rubber flexible coupling torque is transmitted through a comparatively soft rubber section intermediate between hubs on the respective shafts and acting in shear.

Universal joints are commonly used to connect shafts with larger values of misalignment than can be tolerated by the other types of flexible couplings. The known Bendix-Weiss "rolling-ball" universal joint provides constant angular velocity with torque being transmitted between two yokes through a set of four balls such that the centers of all four balls lie in a plane which bisects the angle between the shafts. Other variations of constant velocity universal joints are found in the known Rzeppa, Tracta, and double Cardan types.

Fluid couplings are also known having no mechanical connection between the two shafts, power being transmitted by kinetic energy in the operating fluid, whereby slight lateral and angular misalignments can be tolerated.

Clutches are known couplings that permit the disengagement of the coupled shafts during rotation. Positive clutches, such as the jaw and spiral clutches, transmit torque without slip. Friction clutches reduce coupling shock by slipping during engagement, and also serve as safety devices by slipping when the torque exceeds their maximum rating.

All of the described flexible couplings, as well as other known flexible couplings, are designed to connect shafts which may be slightly misaligned either laterally or angularly. A secondary benefit is the absorption of vibration and impacts due to fluctuations in shaft torque or angular speed. Flexible couplings however suffer a loss in efficiency with increasing angle between the connected shafts. Flexible couplings using fluid, clutch, or elastomeric interfaces for absorbing vibrations and impacts suffer efficiency losses through vibration of the damping medium, while elastomeric interfaces, such as neoprene or nylon, are additionally subject to unacceptably high wear rates.

SUMMARY OF THE INVENTION

The present invention provides an alternative to these standard flexible coupling systems by providing an interface assembly for aligning and rigidly coupling the power plant and vacuum blower such that a direct metal-to-metal drive is operated as the interface assembly.

The interface assembly of the invention interconnects the respective housings and output and input drive shafts of the power plant and vacuum blower by "hard" mounting. The interface assembly of the invention thereby eliminates the vacuum blower-to-power plant lateral and angular alignment problem by interconnecting them with a rigid metal casting interfaced to an adapter plate on the power plant using a plurality of precision alignment pins with matching precision guide holes. Accordingly, the coupler assembly of the invention uses a metal spline to transfer power more efficiently than the prior art means.

Another advantage of the hard mounted metal-to-metal interface of the invention is longevity and reliability. The precise alignment of the drive system greatly reduces required maintenance as compared to prior art drive systems.

The metal-to-metal interface assembly of the invention also eliminates wear of the elastomeric interfaces used for vibration dampening by eliminating flexing within the interface assembly. Accordingly, the elastomeric interfaces are inserted at a rigid, metal-to-metal interface at the adapter plate where flexing of the coupling is greatly reduced or entirely eliminated. Eliminating flexing of the elastomeric interfaces eliminates the loss of efficiency associated with vibration of the elastomeric interfaces, thereby increasing efficiency over the prior art flexible drive.

Unexpected results associated with the metal-to-metal interface assembly of the invention include a significant decrease in vibrations caused by operation of the power plant and vacuum blower. The metal-to-metal interface assembly interconnecting the power plant and vacuum blower significantly alters and reduces the amplitude and frequency of vibration in the system. Because vibrations can induce fatigue loading and affect component life and reliability, reducing vibrations significantly extends the life of the drive system and other surrounding components that are subjected to the vibrations. Additional improvements in efficiency are achieved through reducing energy losses due to vibrations, which reduces heat generation. Lower heat generation results in lower operating temperatures and thereby extends the useful life of surrounding components.

Another unexpected benefit associated with the metal-to-metal interface assembly of the invention is a reduced need for a robust support frame for the carpet cleaning machine. The traditional belt and coupling drive systems require the support frame to absorb and minimize the significant operating vibration. The metal-to-metal interface assembly of the invention reduces the vibration, which permits the support frame to be a much lighter and lower cost design.

Yet another unexpected result of the metal-to-metal interface assembly of the invention is a reduction in assembly time as compared to traditional drive systems. Precision assembly guides and rigid couplings ease assembly and also reduce the time and difficulty level of field-servicing the carpet cleaning machine. Time previously spent realigning the vacuum blower and power supply is eliminated by the self-aligning interface assembly.

Still another unexpected result of metal-to-metal interface assembly of the invention is a significant reduction of emitted sound. The slapping of drive belts and vibrations of traditional coupling systems appear to be a factor in the operating volume (noise) of prior art industrial carpet cleaners because the operating volume of the professional carpet cleaners of the invention is significantly lower, a feature much desired by users of this equipment.

Accordingly, an interface assembly is provided for interconnecting respective housings and output and input drive shafts of a power plant and a vacuum blower by hard mounting, the interface assembly including: an adapter plate secured to a housing of the power plant in rigid and rotationally fixed contact therewith at an output drive shaft thereof, a rigid metal casting interfaced to the adapter plate on the power plant in rigid and rotationally fixed contact therewith, the rigid metal casting further interfaced to a housing of the vacuum blower in rigid and rotationally fixed contact therewith at an input drive shaft thereof; and a rigid coupler assembly interfaced in rigid and rotationally fixed contact to each of the output and input drive shafts for transferring power from the power plant output drive shaft to the vacuum blower input drive shaft.

According to another aspect of the invention, the interface assembly further includes a plurality of precision alignment pins and matching precision guide holes established between the metal casting and the adapter plate.

According to another aspect of the invention, the interface assembly further includes a of precision alignment pins and matching precision guide holes established between the metal casting and the housing of the vacuum blower.

According to another aspect of the invention, the rigid coupler assembly of the interface assembly further includes: a flywheel assembly interfaced in rigid and rotationally fixed contact to the output drive shaft of the power plant; and a rigid coupling interfaced in rigid and rotationally fixed contact between the flywheel assembly and the input drive shaft of the vacuum blower.

According to still another aspect of the invention, the rigid coupler assembly of the interface assembly further includes a metal spline.

According to yet another aspect of the invention, the interface assembly further includes a structurally reinforced face plate in rigid and rotationally fixed contact with the vacuum blower at the input drive shaft thereof and the rigid metal casting being interfaced thereto.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 10, 11 and 12 each illustrate alternative embodiments of the coupling means of the invention illustrated in the embodiment of FIG. 6, wherein FIG. 10 illustrates use of a metal-to-metal C-Face coupling with the interface assembly of the invention, FIG. 11 illustrates use of a metal-to-metal flanged-face coupling with the interface assembly of the invention, and FIG. 12 illustrates use of a metal-to-metal keyless compression coupling with the interface assembly of the invention;

FIGS. 13, 14, 15A and 15B illustrate additional alternative embodiments of the coupling means of the invention illustrated in the embodiment of FIG. 6, wherein FIG. 13 illustrates a known flexible elastomeric compression type coupling that is useful as the coupling means of the invention, FIG. 14 illustrates a known flexible elastomeric shear-type coupling that is useful as the coupling means of the invention, and FIGS. 15A and 15B illustrate respectively an expanded view and an assembly view that together illustrate a known Steelflex coupling that is useful as the coupling means of the invention.

DETAILED DESCRIPTION OF PREFERRED EMBODIMENT

In the Figures, like numerals indicate like elements.

The present invention is an apparatus and method for aligning and rigidly coupling a power plant and vacuum blower in a professional substrate cleaning device such that a rigid, metal-to-metal direct drive is employed as an interface assembly. Accordingly, in a professional substrate cleaning system having an appropriately fueled drive system mounted on a structural frame and coupled for generating high vacuum in a water recovery tank, a high pressure solution hose coupled between a supply of heated and pressurized water-based chemical cleaning solution and a delivery wand or power head for providing hot, high-pressure water-based chemical cleaning solution to a target carpet or other substrate, and a vacuum hose for recovering soiled cleaning solution from the substrate or carpet using the high vacuum generated by the drive system, wherein the drive system includes a power plant having a power output shaft and a vacuum blower having a power input shaft, an interface assembly of the invention is provided for transmitting power from the output shaft of the power plant to the input shaft of the vacuum blower, the interface assembly including: an adapter plate securely bolted to a face of the power plant adjacent to the output shaft; a flywheel assembly securely bolted to the output shaft of the power plant and having a power output surface positioned external to the adapter plate; a robust cast metal bell housing bolted in metal-to-metal contact to the adapter plate of the power plant and in metal-to-metal contact to a face of the vacuum blower adjacent to the input shaft, the bell housing being structured to rigidly coaxially align the input shaft of the vacuum blower and the output shaft of the power plant and being sized to space an end face of the input shaft in close proximity to an output face of the flywheel assembly; and a rigid non-rotational direct drive coupled in metal-to-metal, rotationally fixed contact between the power output surface of the flywheel assembly and the input shaft for transmitting power from the power plant through the flywheel assembly to the input shaft of the vacuum blower.

Figure 1:
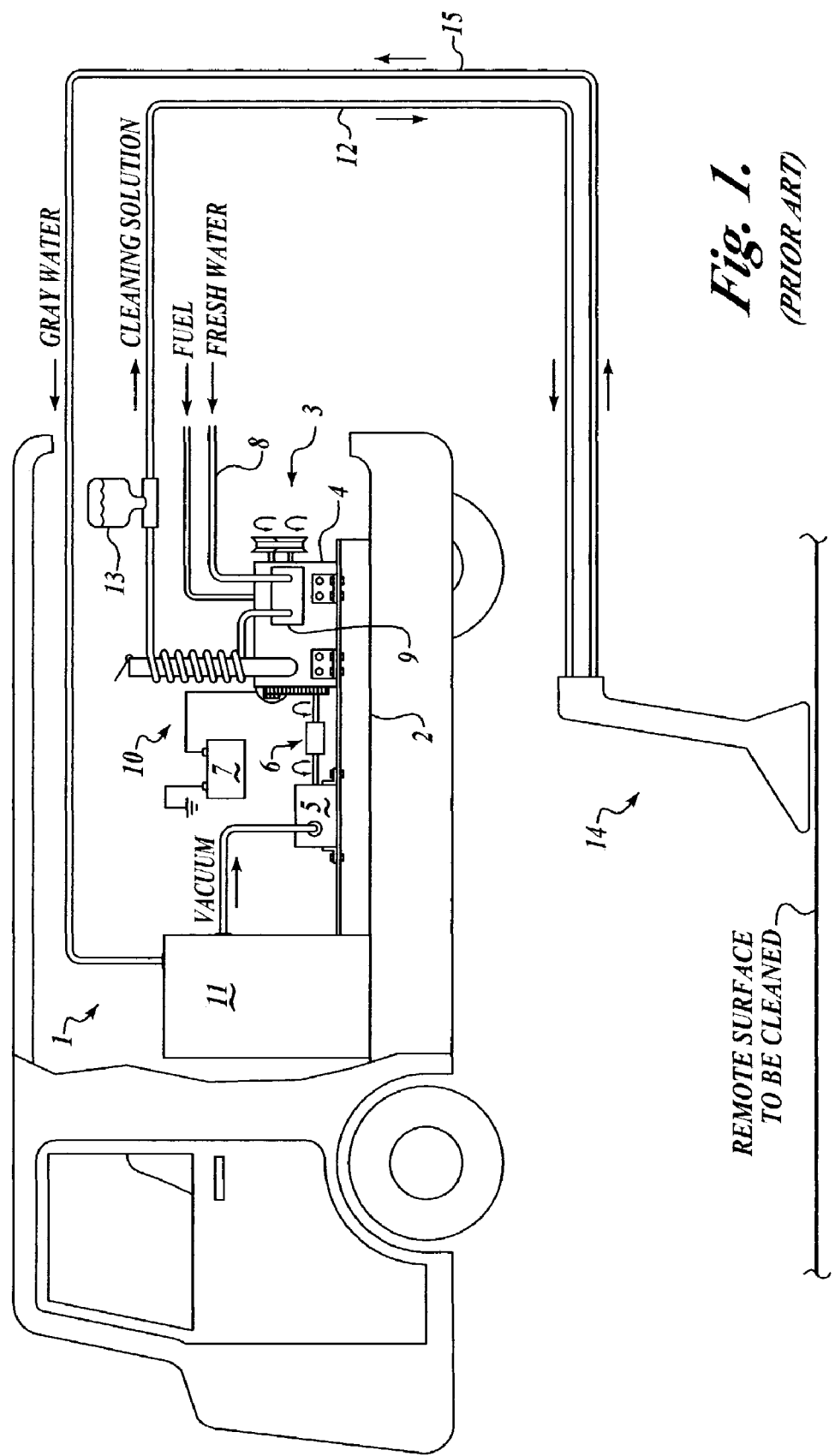
FIG. 1 schematically illustrates a state-of-the-art industrial carpet cleaner system installed in a van.
Figure 2:
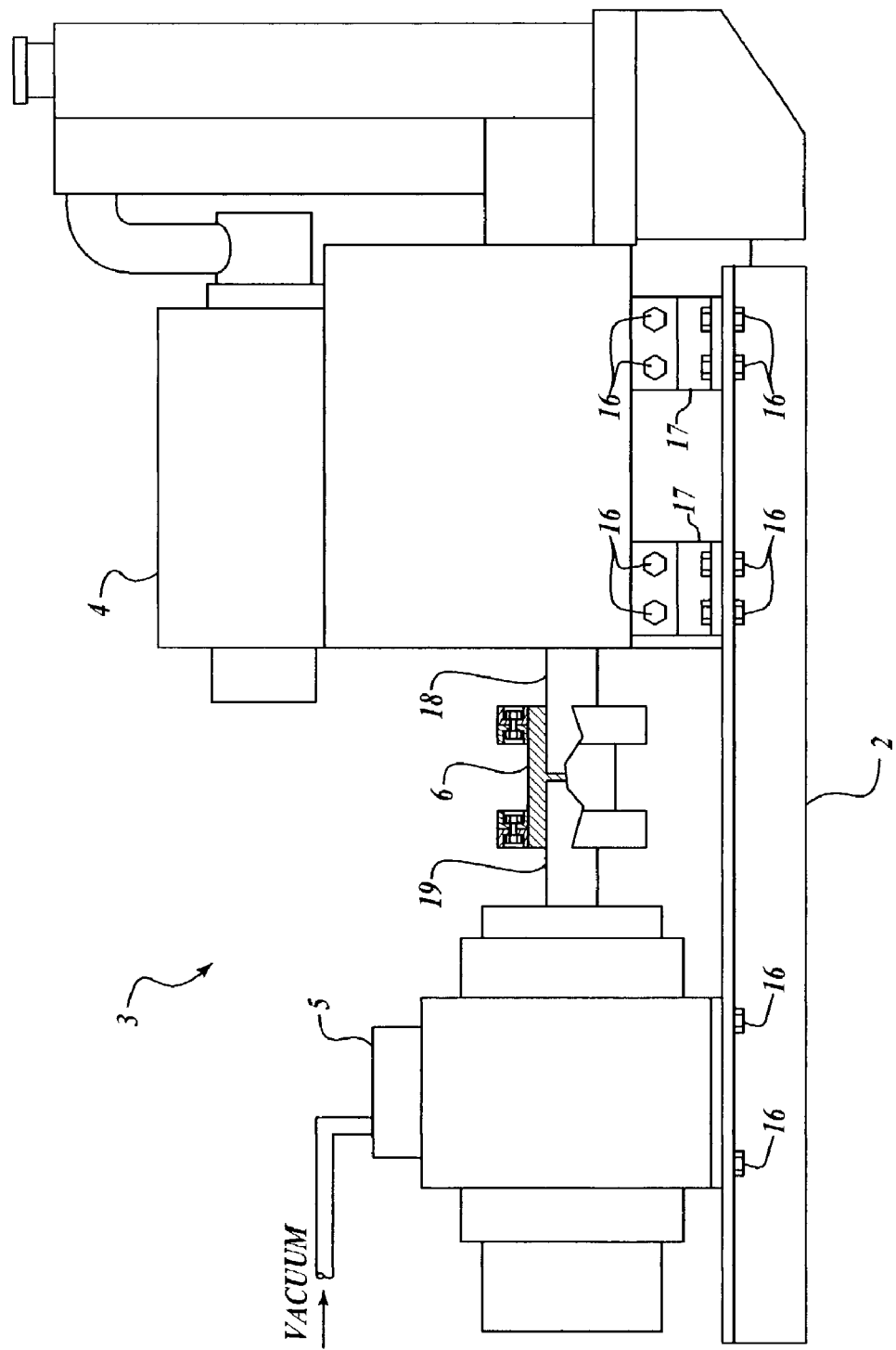
FIG. 2 schematically illustrates a state-of-the-art drive system for the industrial carpet cleaner system of FIG. 1.
Figure 5:
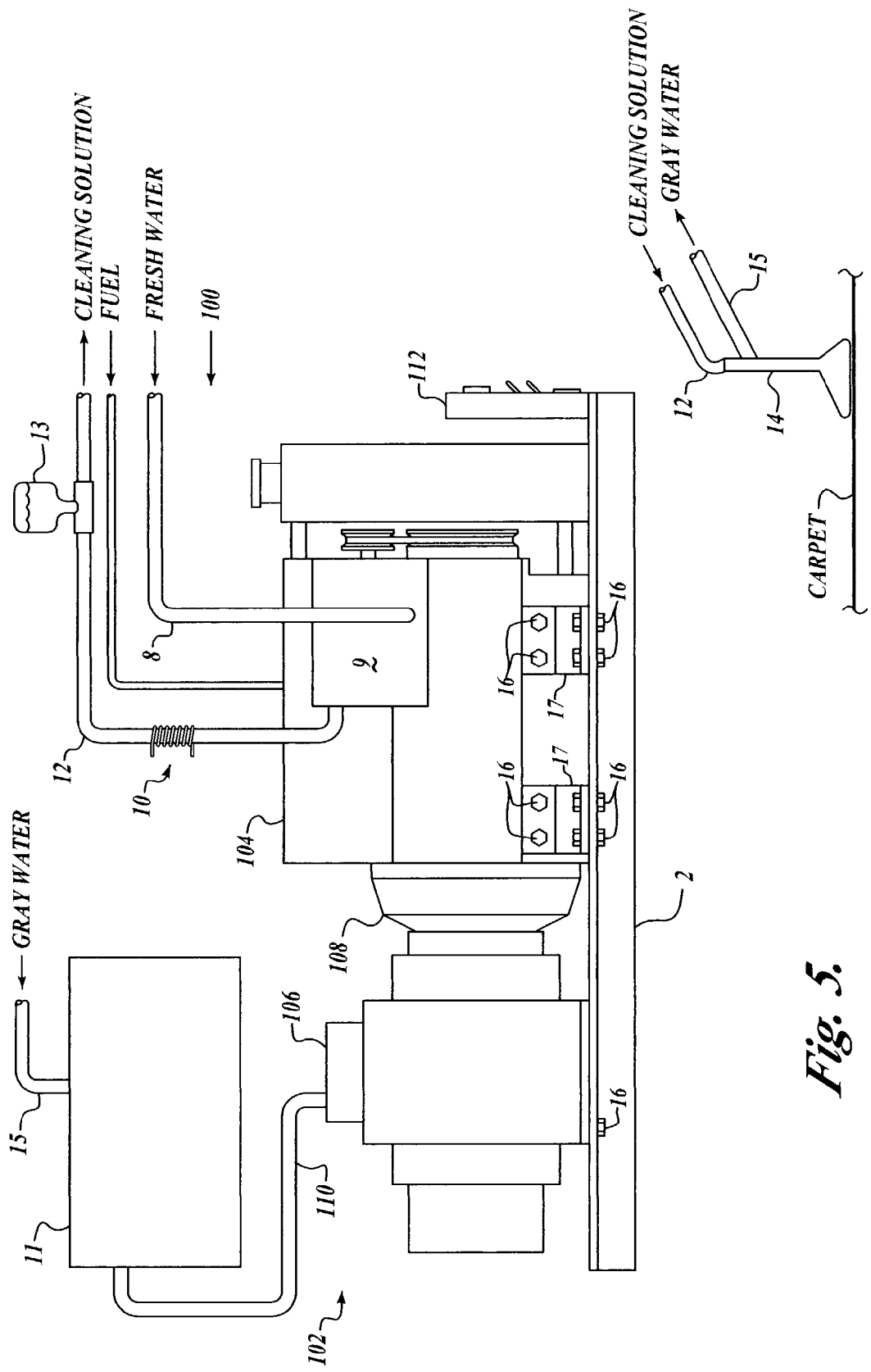
FIG. 5 illustrates the interface assembly of the invention embodied as a rigid, metal-to-metal direct drive in a portable industrial carpet cleaner system.

FIG. 5 illustrates the interface assembly of the invention embodied in a portable industrial carpet cleaner system 100 of the invention as a rigid, metal-to-metal direct drive. Accordingly, a drive system 102 of the invention includes a power plant 104, a vacuum blower 106, and a power transmission interface assembly 108. The vacuum blower 106 is coupled via a high vacuum hose 110 for generating high vacuum in the water recovery tank 11, which provides a suitable volume for carpet and other substrate cleaning operations and includes baffles and filters or another means (not shown) for preventing gray or other water from entering the vacuum blower. The water recovery tank 11 may be mounted, for example, in the vehicle near the drive system 102, as illustrated in FIG. 1.

Components of the drive system 102 are co-mounted on the sturdy metal frame 2 in metal-to-metal contact therewith. As illustrated in FIG. 1, the components are mounted either directly (shown for vacuum blower 106) using the mechanical fasteners 16, e.g., bolts or screws, or using the sturdy metal brackets 17 and mechanical fasteners 16 (shown for power plant 104). The metal frame 2 is, as discussed above, used for mounting the carpet cleaner system 100 of the invention in a van, truck or another suitable vehicle for portability. The metal frame 2 is an economical platform for integrating essential components of the slide-in professional carpet cleaner system. It provides a mounting surface for attaching the system to the commercial vehicle, shown in FIG. 1, and vibration damping during operation of the system. The metal frame 2 may provide an operations panel 112 for mounting gages, switches and controls useful in operation of the system, whereby an operator can read the gages, operate the switches, and operate thermal and fluid management systems. The frame 2 is optionally embodied as an independently portable cart having wheels and may even be sized and structured to incorporate the water recovery tank 11.

The high-pressure fresh water pump 9 is driven by the power plant using a V-belt (shown), gear, direct or other drive for pressurizing fresh water and driving the pressurized water through a thermal management system, such as the heat exchanger and the associated plumbing 10, where it is heated using one or more sources of thermal energy rejected from the power plant 104. The fresh water pump 9 drives the heated water through the solution hose 12 where one or more cleaning chemicals are added from the chemical container or other chemical system 13, and then delivers the water-based chemical cleaning solution to the delivery wand or power head 14 for cleaning the floor, carpet or other substrate. The delivery wand or power head 14 is coupled via the vacuum hose 15 to the water recovery tank 11 and to the high vacuum generated by the drive system 102 for recovering the used cleaning solution from the floor, carpet or other substrate.

An auxiliary pump (not shown), commonly referred to as an APO or Automatic Pump Out device, may be driven by the power plant 104 for automatically pumping used solution from the recovery tank 11 into a sanitary sewer or other approved dumping location. More often, this task is performed manually.

The drive system 102 includes the power plant 104 (shown as a water-cooled internal combustion engine according to one nonexclusive embodiment of the invention), the vacuum blower 106, and the power transmission interface assembly 108 that transmits power from the power plant 104 to the vacuum blower 106. The power plant 104 is, optionally, any steam, electric or internal combustion motor operating with a fuel such as gasoline, diesel, alcohol, or propane or another suitable fuel. According to the invention, the power plant or engine 104, vacuum blower 106 and interface assembly 108 of the drive system 102 are joined together as an integral structural unit and mounted on the rigid metal frame 2.

Figure 6:
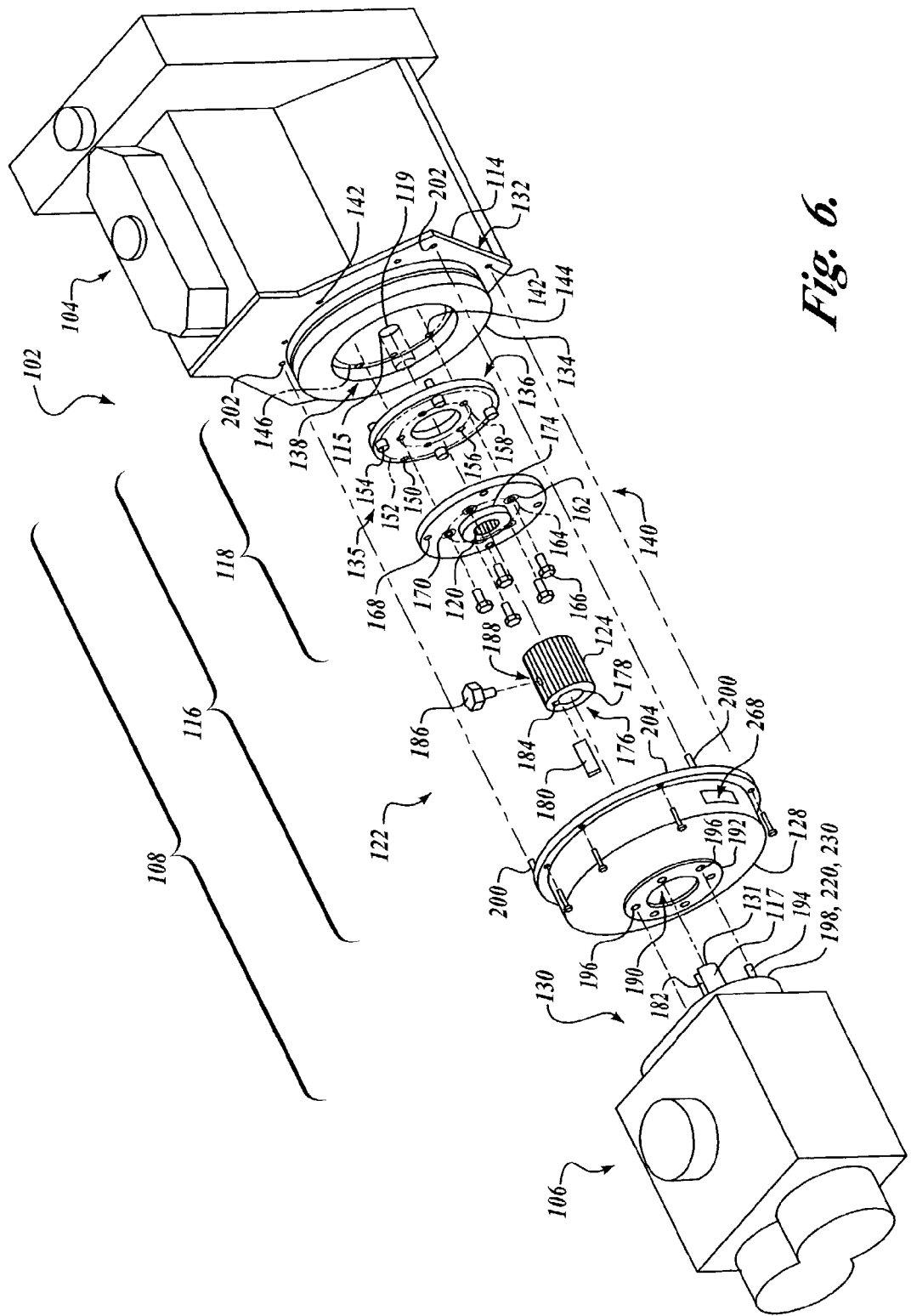
FIG. 6 is a detailed view of one embodiment of the drive system of the invention shown in FIG. 5.

FIG. 6 illustrates the drive system 102 according to one embodiment of the invention. Accordingly, by example and without limitation, the power transmission interface assembly 108 is embodied having: an adapter plate 114 secured in metal-to-metal contact with the power plant 104 adjacent to a power output shaft 115 of the power plant 104; a coupler assembly or coupling means 116 for coupling a power input shaft 117 of the vacuum blower 106 in rigid, rotationally fixed metal-to-metal contact to the power output shaft 115 of the power plant 104, the coupling means 116 including: a flywheel assembly 118 having a power input surface 119 rotationally secured in rigid, metal-to-metal contact to the power output shaft 115 of the power plant 104 external to the adapter plate 114 and having a power output surface 120, and a rigid metal-to-metal coupling 122 having a power input surface 124 rotationally secured between the output surface 120 of the flywheel assembly 118 and the power input shaft 117 of the vacuum blower 106 for transmitting rotational power thereto in the form of torque from the flywheel assembly 118; and a rigid structural connector 128 secured between the adapter plate 114 of the power plant 104 and a face 130 of the vacuum blower 106 adjacent to the power input shaft 117, the connector 128 being structured to rigidly coaxially align the power input shaft 117 of the vacuum blower and the power output shaft 115 of the power plant 104 and being sized to space a distal or end face 131 of the power input shaft 117 in close proximity to the output surface 120 of the flywheel assembly 118.

The flywheel assembly 118 as illustrated in FIG. 6 includes by example and without limitation the adapter plate 114 that is bolted or otherwise secured to a face 132 of the power plant 104 whereat the drive shaft 115 outputs as torque power generated by the power plant. A flywheel 134 is mounted on the drive shaft 115 spaced a clearance distance away from the adapter plate 114 and is secured for transmitting power output by the drive shaft 115. According to the embodiment of the invention illustrated in FIG. 6, the flywheel assembly 118 also includes a rigid annular cast metal disk or plate 135 having a power input surface 136 (far side) bolted or otherwise secured in metal-to-metal contact to a power output face 138 of the flywheel 134 distal from the adapter plate 114. The annular plate 135 is structured of suitable material, diameter and thickness to transmit torque generated by the power plant 104. The flywheel assembly 118 as illustrated in FIG. 6 also includes a coupling hub 140 embodied by example and without limitation as a second rigid annular cast metal plate secured in metal-to-metal contact to the annular plate 135. The coupling hub 140 includes the output surface 120 and is structured of suitable material, diameter and thickness for transmitting torque generated by the power plant 104 and transmitted through the flywheel 134 and annular plate 135.

By example and without limitation, one embodiment of the interface assembly 108 of the invention includes the adapter plate 114 joined by multiple threaded fasteners 142 (shown), or otherwise secured in metal-to-metal contact to the face 132 of the power plant 104 whereat the drive shaft 115 outputs power as torque generated by the power plant 104. The flywheel 134 is mounted on the power plant drive shaft 115 spaced away from the adapter plate 114 on the power plant 104 so as to turn freely without interference with the adapter plate 114 or the power plant 104. The flywheel 134 is rigidly joined to the drive shaft 115 for transmitting power generated by the power plant 104. For example, the flywheel 134 is threaded, pinned, keyed, press fit, or otherwise rigidly secured in metal-to-metal contact to the drive shaft 115.

The power output face 138 of the flywheel 134 is provided with rigid, non-rotational attachment means, such as multiple threaded holes 144 in a circular pattern 146 (shown), or other suitable attachment means for rigidly and non-rotationally joining in metal-to-metal contact thereto. The rigid annular metal plate 135 is rigidly attached to the flywheel 134 in metal-to-metal contact therewith. For example, the annular metal plate 135 is provided with multiple clearance holes 150 in a circular pattern 152 matched to the circular pattern 146 on the flywheel 134. The power input surface 136 (far side) of the annular metal plate 135 is flush mounted against the power output surface 138 of the flywheel 134. A quantity of suitably sized fasteners 154, such as screws or bolts, rigidly secure the power input surface 136 of the annular metal plate 135 in metal-to-metal contact to the flywheel power output surface 138.

The annular metal plate 135 is further provided with non-rotational attachment means for rigidly joining in metal-to-metal contact thereto. For example, the annular plate 135 is provided with multiple threaded holes 156 in a circular pattern 158 (shown), which may be different from or rotated and interspersed within the pattern 152 of clearance holes 150. Alternatively, the annular metal plate 135 is provided with other suitable non-rotational attachment means for rigidly joining in metal-to-metal contact thereto.

The coupling hub 140 includes means for attaching in rigid, non-rotational metal-to-metal contact to the annular metal plate 135. For example, the coupling hub 140 includes multiple clearance holes 162 in a circular pattern 164 matched to the circular pattern 158 of the annular plate 135. A quantity of threaded fasteners 166, e.g., screws or bolts, are sized to pass through the clearance holes 162 in the coupling hub 140 and mate with the different threaded holes 156 for rigidly joining the coupling hub 140 in metal-to-metal contact to the annular metal plate 135. The coupling hub 140 is thus rigidly attached in metal-to-metal contact to the flywheel 134 through the annular plate 135.

The coupling hub 140 includes a quantity of clearance holes 168 positioned and sized to clear the heads of the fasteners 166 joining the annular metal plate 135 to the flywheel 134. The clearance holes 168 permit the coupling hub 140 to be flush mounted against the annular plate 135 in metal-to-metal contact therewith. Alternatively, the clearance holes 168 are counter bores in the mating face of the coupling hub 140, or the fasteners 166 are flush mounted in the annular metal plate 135 so as not to require clearance for the fastener heads.

According to one embodiment of the invention, each of the multiple through holes 162 in the coupling hub 140 is enlarged and an elastomeric insert 170, e.g., a tubular neoprene bushing, is installed therein. The threaded fasteners 166 are passed through the neoprene bushings 170 and mated with the different threaded holes 156 for joining the coupling hub 140 to the annular metal plate 135 in metal-to-metal contact therewith. The neoprene bushings 170 dampen rotational vibrations between the power plant 104 and the vacuum blower 106. Flush mounting of the coupling hub 140 and annular plate 135 against the flywheel 134 removes the neoprene bushings 170 from the shaft coupler, and thereby eliminates its effect on alignment of the drive shafts 115, 117. As a further advantage, eliminating flexing of the neoprene bushings 170 extends their operational life.

The conjoined flywheel 134, annular plate 135 and coupling hub 140, together with the optional neoprene bushings 170 and the different fasteners, constitute the flywheel assembly 118 of the invention. The coupling hub 140 includes a robust oversized and reinforced central hub portion 174 that is structured with the flywheel assembly output surface 120 for forming a substantially inflexible or rigid, rotationally fixed, metal-to-metal mechanical joint with the drive shaft 117 of the vacuum blower 106 for directly transmitting torque thereto from the power plant 104. For example, the flywheel assembly output surface 120 is a bore in the central hub portion 174, the bore being formed with an internal spline (shown), a keyway or another suitable means for forming a rigid and rotationally fixed metal-to-metal joint with the power input surface 124 of the coupling 122, and thence to the vacuum blower drive shaft 117.

The coupling 122 includes, by example and without limitation, a hub 176 formed with the power input surface 124 and a power output surface 178. The power input surface 124 is structured to cooperate with the power output surface 120 portion of the coupling hub 140 to form a rigid, rotationally fixed metal-to-metal joint. For example, when the power output surface 120 is a bore embodied with an internal spline, the power input surface 124 of the cooperating hub 176 is embodied as an external spline structured to mate with the internal spline 120.

The power output surface 178 is structured to cooperate with the power input drive shaft 117 to form a rigid, rotationally fixed metal-to-metal joint therewith. The hub 176 thereby forms a rigid, rotationally fixed metal-to-metal joint between the vacuum blower 106 and the power plant 104 for directly transmitting torque thereto. For example, the power output surface 178 is embodied as an internal bore sized to accept the power input or drive shaft 117 of the vacuum blower 106.

The coupling 122 also includes means for rotationally fixing the hub 176 relative to the vacuum blower power input shaft 117. For example, a key 180 is inserted in respective cooperating keyways 182, 184 in the input drive shaft 117 of the vacuum blower 106 and the internal bore 178 of the hub 176. The key 180 thus rotationally fixes the hub 176 relative to the blower shaft 117 for transmitting torque through the interface assembly 108 to the vacuum blower 106. According to one embodiment of the invention, the coupling 122 also includes a set screw 186 or other keeper means which is inserted into a threaded hole 188 bored through a wall of the hub 176.

The structural connector 128 is embodied, by example and without limitation, as a rigid metal casting or bell housing that is bolted or otherwise secured to the face 130 (far side) of the vacuum blower 106 wherefrom the power input or drive shaft 117 projects. The bell housing 128 is structured to achieve during assembly precise coaxial alignment of the vacuum blower input drive shaft 117 with the power plant output drive shaft 115. The bell housing 128 is embodied having a sufficiently robust structure to maintain the precise coaxial shaft alignment against torques output by the power plant 104. The rigid bell housing 128 is further sized to space the vacuum blower 106 away from the flywheel 134 on the power plant 104 a distance determined to permit the interface assembly 108 to fit between the face 130 of the vacuum blower 106 and the adapter plate 114 on the power plant 104 and in rigid, rotationally fixed, metal-to-metal contact between the vacuum blower input drive shaft 117 and the power plant output drive shaft 115.

An aperture 190 through one face 192 of the cast metal bell housing 128 is passed over the input drive shaft 117 and precisely aligned therewith by mating one or more precision guide pins 194 and mating guide holes 196 between the face 192 of the bell housing 128 and a face plate 198 on the vacuum blower 106 adjacent to the drive shaft 117. The bell housing 128 is secured in rigid, rotationally fixed, metal-to-metal contact by multiple threaded fasteners (shown) or otherwise to the face 130 of the vacuum blower 106 adjacent to the drive shaft 117.

Optionally, a gasket material is installed at the interface between the face 192 of the cast metal bell housing 128 and the face plate 198 on the vacuum blower 106 without interfering with the rigid, rotationally fixed security provided between the bell housing 128 and the vacuum blower 106.

After being rigidly joined and rotationally secured to the drive shaft 117 of the vacuum blower 106 as described herein, the splined hub 176 is inserted into the internally splined central hub portion 174 of the coupling hub 140. The intermeshed output and input splines 120, 124 thereby conjoin the input drive shaft 117 in rigid, rotationally fixed, metal-to-metal contact with the output drive shaft 115. Torque generated by the power plant 104 is thus transmitted to the vacuum blower 106 without relative rotational motion between the output and input drive shafts 115, 117.

The rigid structural connector embodied as the bell housing 128, being already bolted or otherwise secured to the face plate 198 of the vacuum blower 106, is bolted or otherwise secured to the adapter plate 114 on the power plant 104. The bell housing structural connector 128 portion of the interface assembly 108 thus rigidly couples the vacuum blower 106 to the power plant 104 in a integral structural unit, while the metal-to-metal coupling 122 rigidly couples and rotationally fixes the drive shaft 117 of the vacuum blower 106 to the drive shaft 115 of the power plant 104 through the flywheel assembly 118.

Accordingly, one or more precision guide pins 200 and mating guide holes 202 between the bell housing 128 and the adapter plate 114 assist in aligning the blower and power plant shafts 117, 115 as well as the intervening flywheel assembly 118 and coupling 122. For example, multiple guide pins 200 are positioned at a reinforced outer lip portion 204 of the bell housing 128 opposite from the blower mounting face 192, and the adapter plate 114 includes cooperating guide holes 202 for precisely aligning the blower input drive shaft 117 relative to the power plant output drive shaft 115. The pins 194, 200 in respective guide holes 196, 202 also prohibit relative rotational motion between the vacuum blower 106 and power plant 104 when torque generated by the power plant 104 is transmitted through the interface assembly 108 to the vacuum blower 106. The pins 194, 200 and respective guide holes 196, 202 thereby mitigate against the eccentric loads generated by the asymmetric radial shock pulses along the driven shaft 117 when the vacuum blower is in operation.

The pins 194, 200 and respective guide holes 196, 202 also make possible in-field repairs by providing precision references for reassembly when the drive system 102 is disassembled, e.g., after replacement of vacuum blower drive shaft bearing and seal components.

Optionally, a gasket material is installed at the interface between the outer lip portion 204 of the cast metal bell housing 128 and the adapter plate 114 on the power plant 104 without interfering with the rigid, rotationally fixed security provided between the bell housing 128 and the power plant 104.

The bell housing 128, with the blower 106 rigidly attached, is rigidly coupled to the power plant 104 by bolting or other rigid attachment means to the adapter plate 114 on the face 132 thereof adjacent to the output drive shaft 115. Three bolted or other rigid metal-to-metal connections thus combine to rigidly couple the vacuum blower 106 to the power plant 104 in a single integrated structural unit with the power transmission interface assembly 108, the combination of which forms the drive system 102 of the invention. One connection is between one surface 192 of the bell housing 128 and the face plate 198 on the vacuum blower 106, a second connection is between adapter plate 114 and the power plant 104, and the third connection is between bell housing 128 and the adapter plate 114 at the lip 204 on the opposite surface of the bell housing 128 from the surface 192.

Figure 7A:
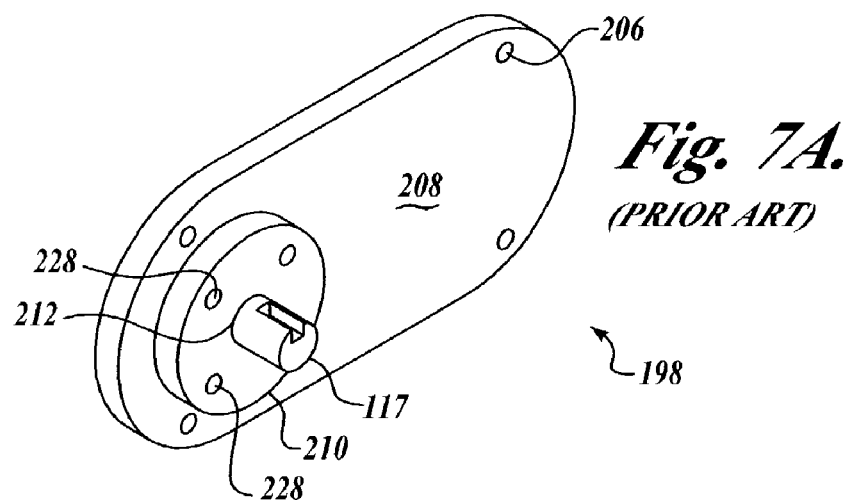
FIGS. 7A and 7B illustrate, respectively, opposing outer and inner surfaces of a conventional vacuum blower face plate normally provided with a conventional vacuum blower.
Figure 7B:
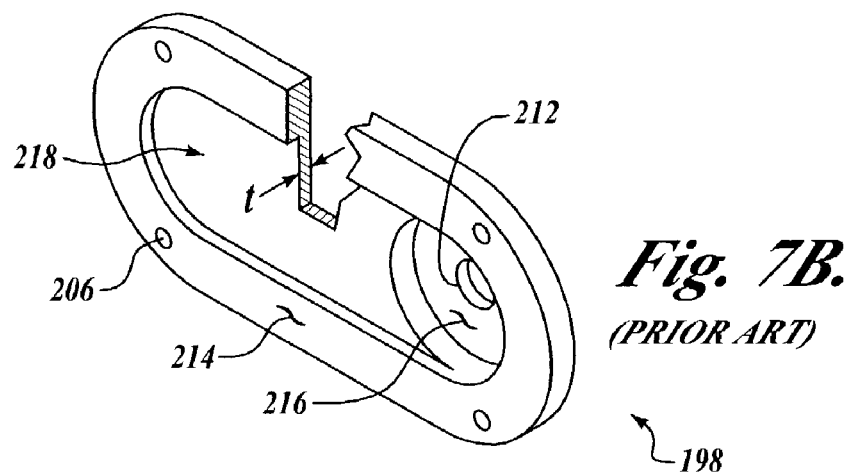

FIGS. 7A and 7B illustrate, respectively, opposing outer and inner surfaces of a conventional vacuum blower face plate 198 normally provided with the vacuum blower 106. The conventional vacuum blower face plate 198 is, for example, a finish-machined cast metal plate sized to mate with the vacuum blower 106 adjacent to the input drive shaft 117 (shown in place in FIG. 7A). The conventional face plate 198 has multiple through holes 206 in positions coordinated for joining it to the vacuum blower 106 using, for example, threaded fasteners such as screws or bolts. An outer surface 208 of the face plate 198 (shown in FIG. 7A) includes a reinforced boss 210 having an aperture 212 therethrough to accommodate the drive shaft 117.

FIG. 7B illustrates an inner surface 214 of the conventional vacuum blower face plate 198, which is machine finished to mate with vacuum blower 106. Contained in the inner surface 214 behind and concentric with the boss 210 is a recessed seat 216 for a drive shaft bearing and seal (not shown) of a design well-known to those of skill in the relevant art. The inner surface 214 also contains an oil reservoir 218 that in practice holds oil for lubricating the drive shaft bearing and other parts of the vacuum blower 106. As illustrated, the oil reservoir 218 is behind the outer surface 208 and significantly thins it to a minimal thickness "t" (shown in cross-section), thereby making the outer surface 208 subject to flexing or "oil canning" when subjected to the heavy torque loads applied by the power plant 114 through the transmission interface 118. Over time, such flexing may result in oil leaks, metal fatigue, micro-cracking, and catastrophic failure of the face plate 198.

Figure 8:
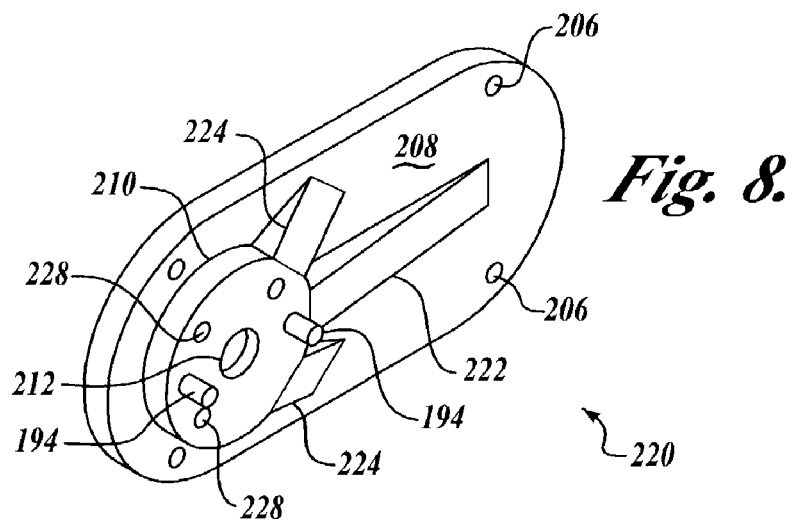
FIG. 8 illustrates, by example and without limitation, a robust reinforced vacuum blower face plate of the invention.

FIG. 8 illustrates, by example and without limitation, a robust reinforced face plate 220 of the invention. According to one embodiment of the invention, the face plate 220 is similar to the conventional face plate 198 as illustrated in FIGS. 7A, 7B, except that the reinforced face plate 220 of the invention includes, by example and without limitation, one or more respective elongated crosswise ribs 222 and foreshortened diagonal ribs 224 radiating from the boss 210 to at least part way across the outer surface 208. The one or more ribs 222, 224 effectively stiffen that portion of the outer surface 208 thinned by the oil recess 218 (shown in FIG. 7B). The one or more ribs 222, 224 provide reinforced support for the cantilevered mass of the vacuum blower 106 within the drive system 102 of the invention, and provide reinforcing to the thinned outer surface 208 for resisting torque input to the drive shaft 117 for driving the blower. The precision guide pins 194 project from the face plate 220 for aligning the blower power input shaft 117 with the structural connector 128, i.e., the bell housing. For example, the multiple precision guide pins 194 project from the reinforced boss area 210 adjacent to the drive shaft aperture 212. Attachment means in the form of a quantity of threaded holes 228 are provided in a pattern centered on the drive shaft passage 212 and matched to the mounting holes in the face 192 of the cast metal structural connector 128, i.e., bell housing 128 shown in FIG. 6.

Figure 9A:
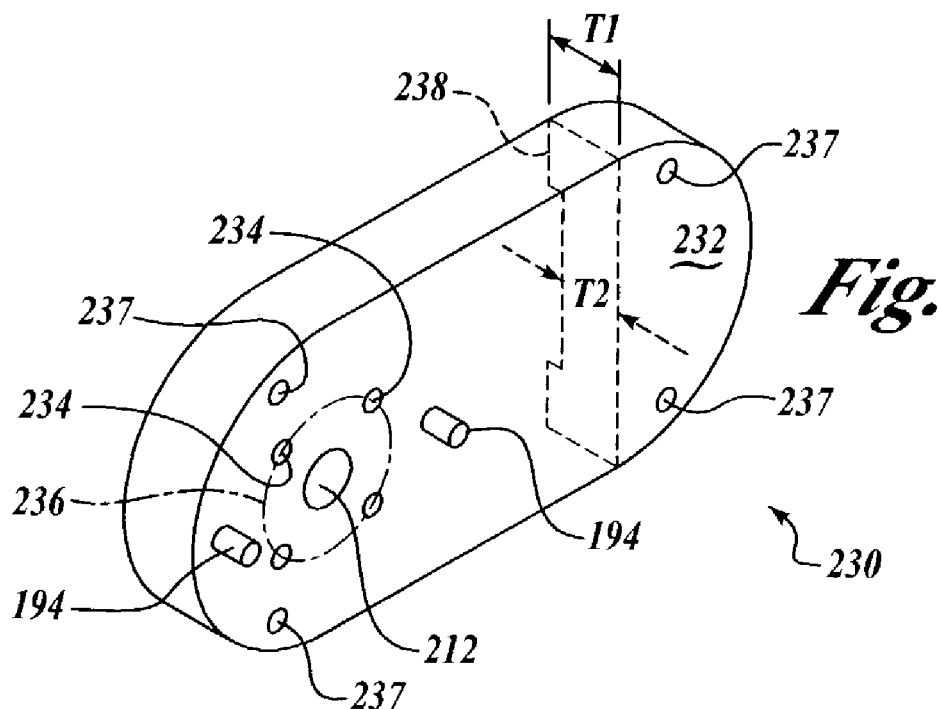
FIGS. 9A and 9B illustrate, by example and without limitation, respective opposing outer and inner surfaces of an alternative robust oversized and reinforced vacuum blower face plate of the invention.
Figure 9B:
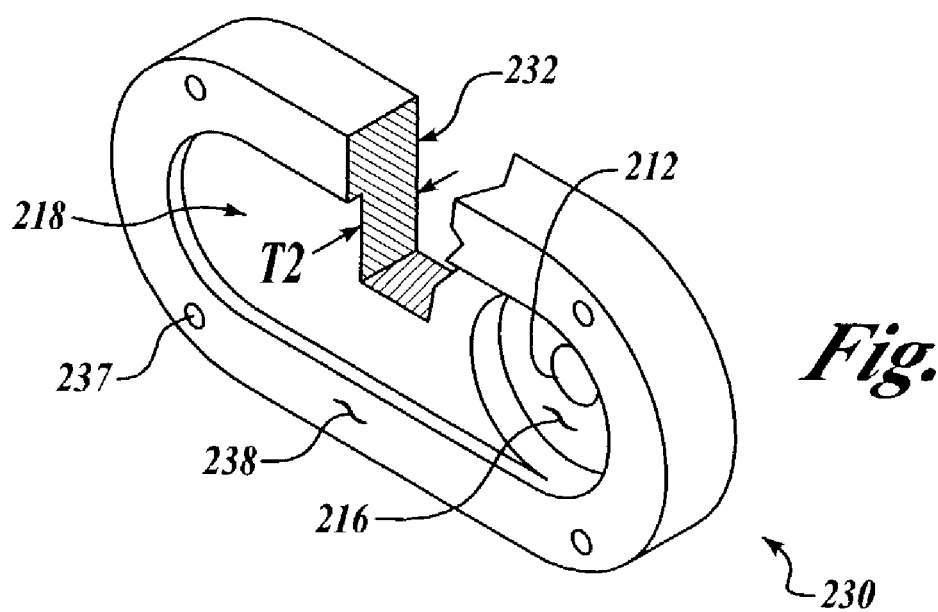

FIGS. 9A and 9B illustrate, by example and without limitation, respective opposing outer and inner surfaces of an alternative robust oversized and reinforced face plate 230 of the invention. According to one embodiment of the invention, the face plate 230 of the vacuum blower 106 adjacent to the input drive shaft 117 is robustly oversized and reinforced relative to a conventional vacuum blower face plate 198 (illustrated in FIGS. 7A, 7B). The face plate 230 of the invention is oversized to provide reinforced support for the mass of the vacuum blower 106 within the drive system 102 of the invention, and to provide a reinforced rigid mass for reacting to torque input to the drive shaft 117 for driving the blower. For example, the face plate 230 of the invention is structured as a heavy metal plate, either machined or cast and finish machined, to replace the conventional face plate 198 and mate with the vacuum blower 106. The face plate 230 of the invention, for example, includes thickness "T1" (shown in FIG. 9A) increased to about, or more than, the full thickness of the conventional face plate 198 as measured at the increased thickness at the boss 210. The thickness increase of the overall face plate results in an increased thickness "T2" (shown in cross-section) across the entire face of the recessed oil reservoir 218, in contrast to the conventional face plate 198 that is only thickened by the boss 210 at the drive shaft passage 208.

The outer surface 232 of the face plate 230 is thus flush with the thickened area around the drive shaft passage 212 where the conventional face plate 198 is thickened by the boss 210. The precision guide pins 194 project from the face plate 230 adjacent to the drive shaft aperture 212 for aligning the bell housing 128. Threaded through holes 234 are provided in a pattern 236 centered on the drive shaft passage 212 and matched to the mounting holes in the face 192 of the cast metal structural connector 128, i.e., bell housing 128 shown in FIG. 6

Through holes 237 may be longer than the face plate mounting holes 206 in the conventional face plate 198 (shown in FIGS. 7A, 7B) thus requiring longer fasteners for attachment to the vacuum blower 106.

FIG. 9B illustrates an inner face 238 of the face plate 230, which includes the recessed drive shaft bearing and seal seat 216 pierced by the drive shaft passage 212 to accommodate the input drive shaft 117 when installed on an otherwise conventional vacuum blower 106. As in the conventional face plate 198, the recessed drive shaft bearing seat 212 communicates with the recessed oil reservoir 218 and in practice holds oil for lubricating the drive shaft bearing and other parts of the vacuum blower 106.

Figure 10:
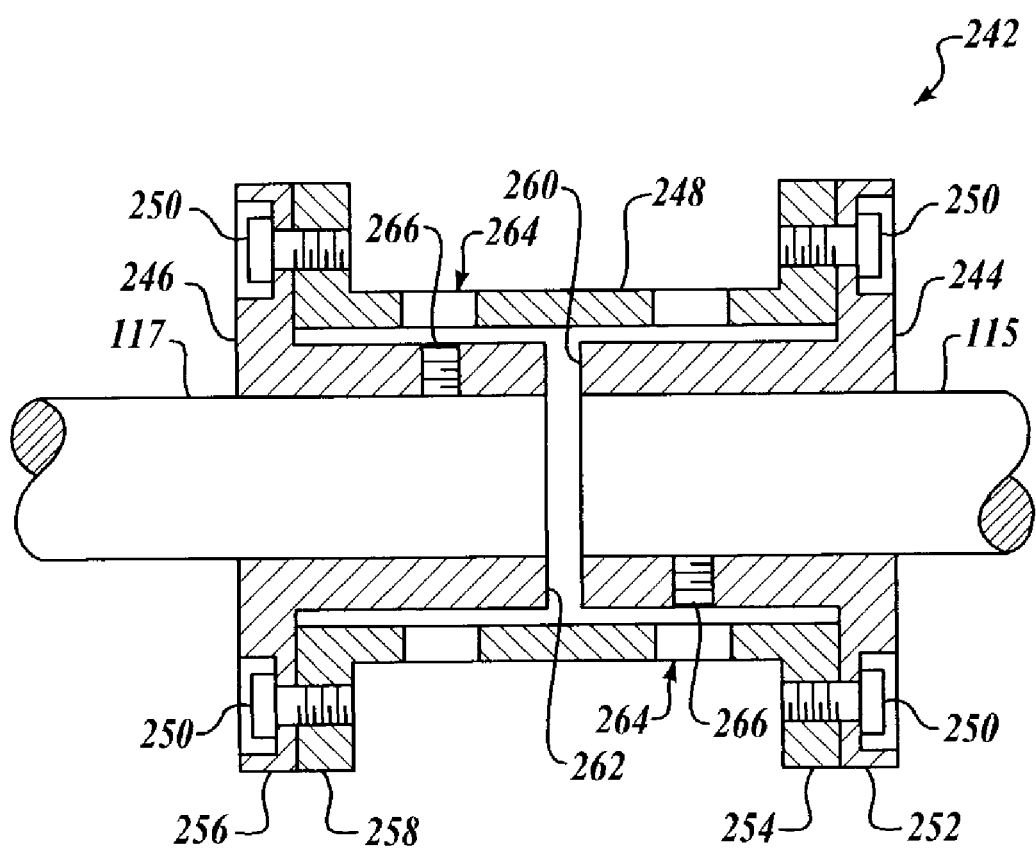
Figure 11:
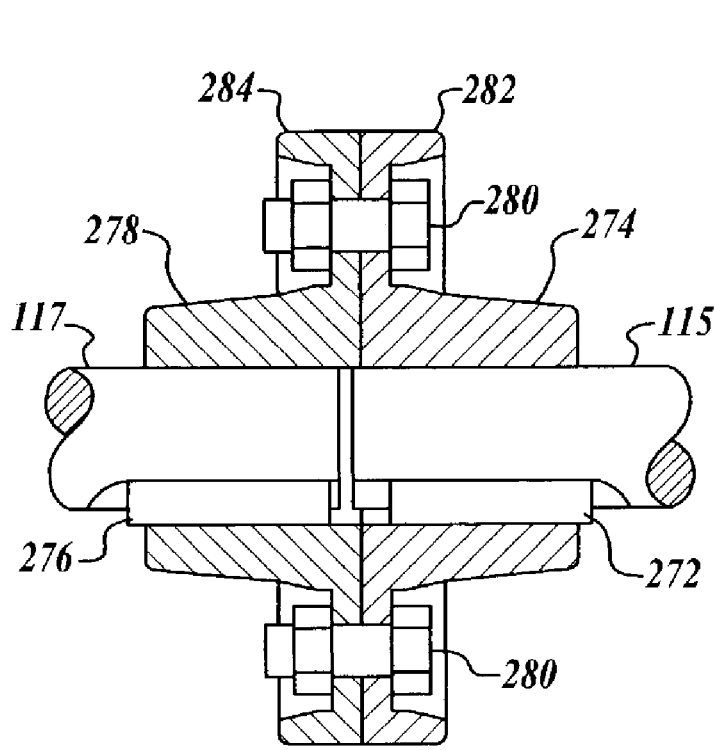
Figure 12:
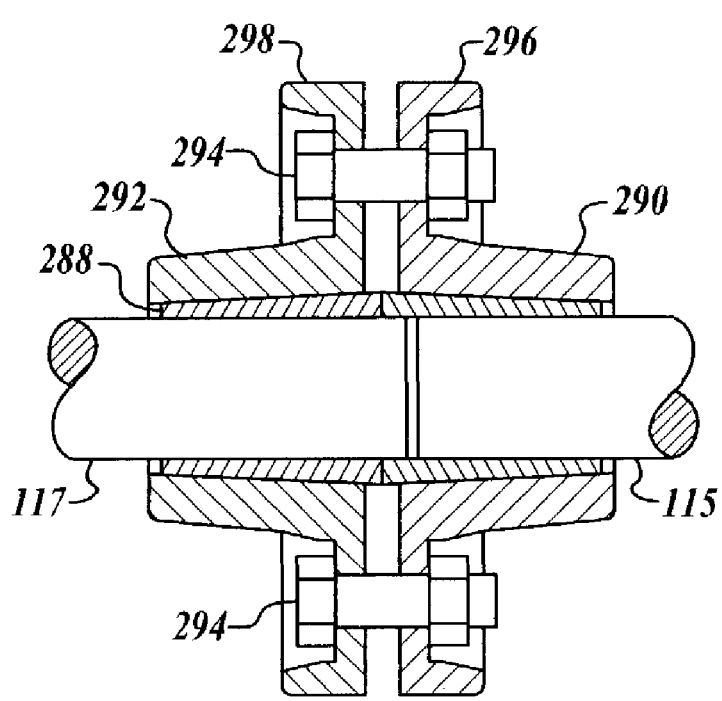

FIGS. 10, 11 and 12 each illustrate alternative embodiments of the coupling means 116 (provided in the embodiment of FIG. 6 by the flywheel assembly 108 and coupling 122) for forming the rigid, non-rotational, metal-to-metal mechanical joint between the input drive shaft 117 and the output drive shaft 115 for directly transmitting power to the vacuum blower 106 from the power plant 104. Such alternative embodiments of the coupling means are useful when the power plant 104 is equipped with an elongated output drive shaft 115 (illustrated in phantom in FIG. 6) that projects beyond the adapter plate 114.

Figure 3A:
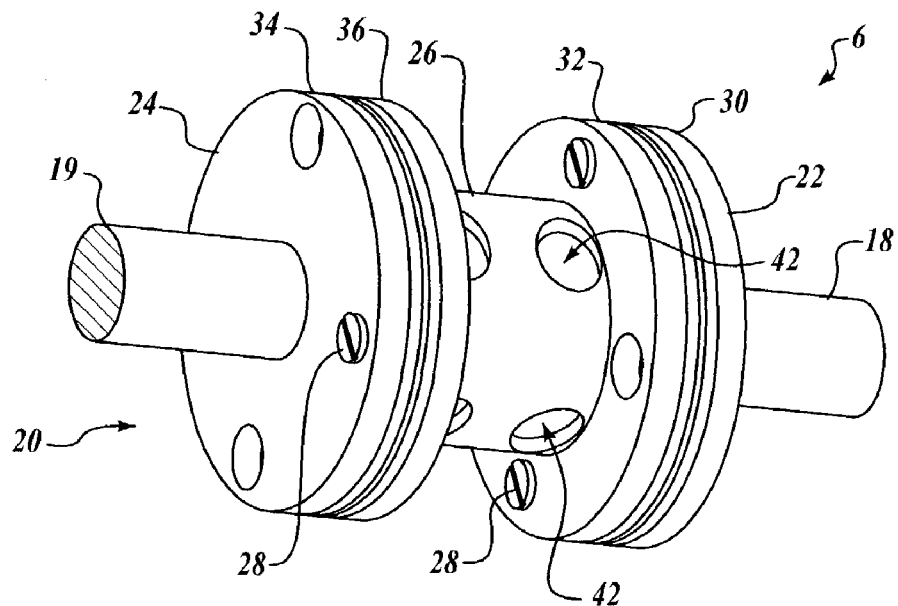
FIG. 3A is perspective view of a known C-Face drive coupling.
Figure 3B:
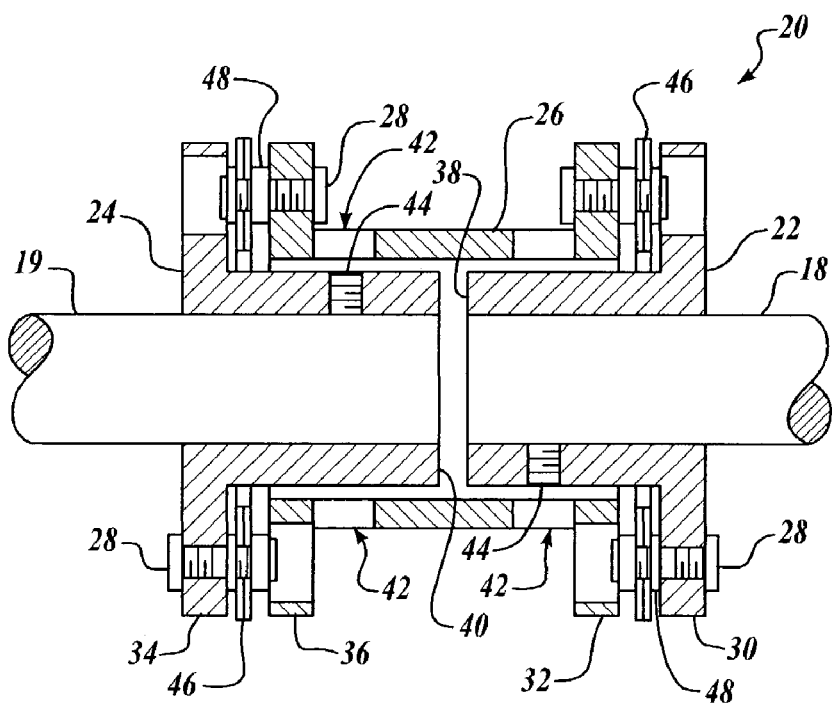
FIG. 3B is a cross-section view through the C-Face coupling of FIG. 3A.
Figure 4A:
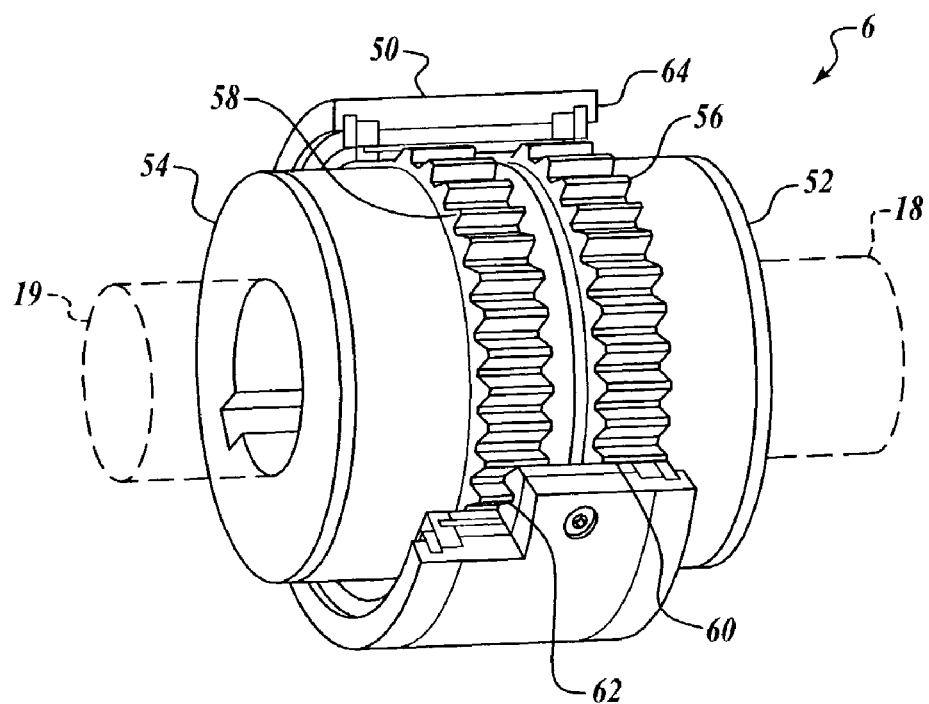
FIG. 4A is a perspective view of a known flexible Waldron coupling.
Figure 4B:
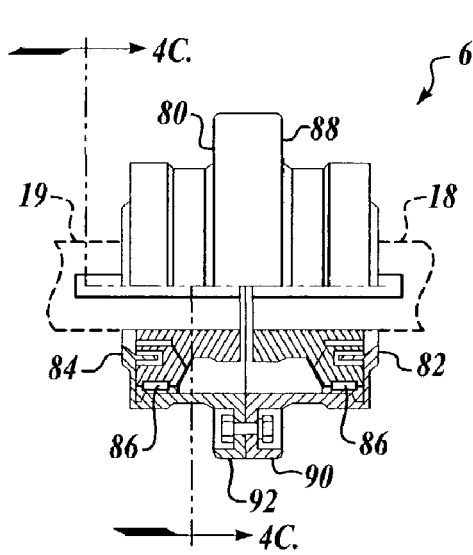
FIG. 4B is a partial cut-away side view of a known Fast flexible coupling.
Figure 4C:
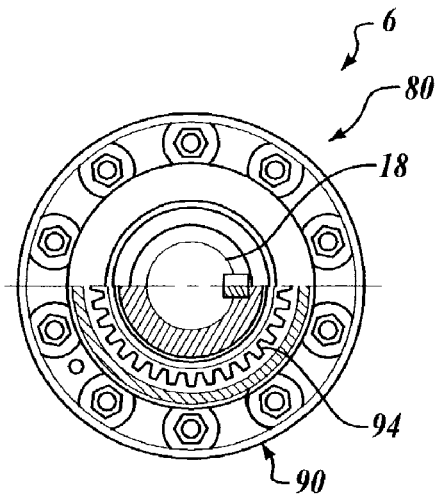
FIG. 4C is an end-on section view of the known Fast flexible coupling of FIG. 4B.

The C-Face coupling 242 of the invention is, by example and without limitation, similar to the conventional C-Face coupling 20 illustrated in FIGS. 3A, 3B. The C-Face coupling 242 however provides a rigid, substantially inflexible metal-to-metal mechanical joint between the drive shafts 115, 117.

The rigid metal-to-metal C-Face coupling 242 is useful only because the coupling of the robust structural connector 128 (embodied in FIG. 6 as bell housing 128) with the adapter plate 114 aligns the input drive shaft 117 with the elongated embodiment of the output drive shaft 115, and because the structural connector 128 and adapter plate 114 combine to maintain the shaft alignment during operation of the industrial carpet cleaner system 100 of the invention. In contrast, when the power plant 4 and vacuum blower 5 are independently mounted on the frame 2, according to the prior art system shown in FIG. 1, the interface 6 must be one of the known flexible, fluid and clutch couplings discussed herein to accommodate the lateral and angular misalignments inherent in the prior art independent mounting setup described above.

Accordingly, FIG. 10 illustrates, by example and without limitation, a known C-Face coupling 242 useful for forming a rigid, rotationally fixed metal-to-metal mechanical joint between the power plant output drive shaft 115 and the vacuum blower input drive shaft 117. FIG. 10 is a cross-section through the C-Face coupling 242 showing the power plant output drive shaft 115 and the vacuum blower input drive shaft 117 joined and rotationally fixed in metal-to-metal contact to respective inwardly facing rigid hubs 244, 246. The two hubs 244, 246 are both directly joined and rotationally fixed in metal-to-metal contact to a rigid center section 248 of the C-Face coupling 242 by multiple fasteners 250 between respective cooperating flanges 252, 254 and 256, 258, which cooperating pairs form rigid, rotationally fixed metal-to-metal joints. Torque generated by the power plant 104 and output through drive shaft 115 is thus transmitted directly through the C-Face coupling 242 and input to the vacuum blower 106 through its drive shaft 117.

FIG. 10 also shows the elongated portions 260, 262 of the respective hubs 244, 246 inside a bore through the center section 248. The C-Face coupling 242 is alternatively expanded as necessary by reversing either or both of the hubs 244, 246 such that its respective elongated portion 260, 262 is outside the center section 248.

Multiple access holes 264 through the wall of the center section 248 permit access to install multiple fasteners 266, such as pins or set screws (shown), through the walls of the elongated hub portions 260, 262 for rotationally fixing the output and input drive shafts 115, 117 relative to the respective hubs 244, 246.

According to one embodiment of the invention, access is provided through the structural connector or bell housing 128 (shown in FIG. 6) for securing the set fasteners 266, whereby the C-Face coupling 242 is secured to the respective power output and power input drive shafts 115, 117 of the power plant 104 and vacuum blower 106. The access is embodied, for example, as a removable access panel 268 (shown in FIG. 6) in the structural connector or bell housing 128.

FIG. 11 illustrates, by example and without limitation, another alternative rigid metal-to-metal coupling for use with the drive system 102 of the invention. FIG. 11 illustrates a known flanged-face coupling 270, which is a very simple rigid metal-to-metal coupling useful only on shafts which are precisely aligned. Securing the adapter plate 114 to the bell housing 128 ensures precise alignment relative to the power plant output shaft 115. Securing the bell housing 128 to the vacuum blower cover plate 198, 220, 230 ensures precise alignment relative to the vacuum blower input shaft 117.

A first key 272 eliminates relative rotation between the power output shaft 115 and a precision machined collar 274 fitted around the shaft 115. A second key 276 eliminates relative rotation between the power input shaft 117 and another precision machined collar 278 fitted around the shaft 117.

The precision machined collars 274, 278 provide the rigid, rotationally fixed metal-to-metal coupling of the respective output and input shafts 115, 117 when multiple fasteners 280 bolt or otherwise securely connect respective collar flanges 282, 284.

FIG. 12 illustrates use of the known keyless compression coupling 286 as yet another alternative rigid metal-to-metal coupling for use with the drive system 102 of the invention. The keyless compression coupling 286 affords a simple means for connecting the abutting power output and power input drive shafts 115, 117 in rigid, rotationally fixed metal-to-metal contact without the necessity of machining key seats on the shafts. When drawn over a slotted tapered sleeve 288 installed around the two shafts, two collars 290, 292 automatically center the shafts. When drawn tight by fasteners 294 through respective flanges 296, 298, the tapered sleeve 288 provides sufficient contact pressure to transmit medium or light loads without relative rotational slippage.

The professional carpet cleaner system 100 of the invention may also be practiced with any of the known flexible, fluid and clutch couplings, such as one of the examples discussed herein or another suitable flexible coupling or rigid, rotationally fixed metal-to-metal coupling, when the adapter plate 114 and bell housing 128 are emplaced to precisely align the input drive shaft 117 of the vacuum blower 106 with the elongated output drive shaft 115 of the power plant 104 and to maintain the alignment against torque transmitted through the interface assembly 108 during operation.

For example, the professional carpet cleaner system 100 of the invention is alternatively practiced using the known flexible "Waldron" coupling 50 discussed herein as the coupler assembly or coupling means 116 for coupling the power input shaft 117 of the vacuum blower 106 in a flexible, rotationally fixed contact to the power output shaft 115 of the power plant 104.

Figure 13:
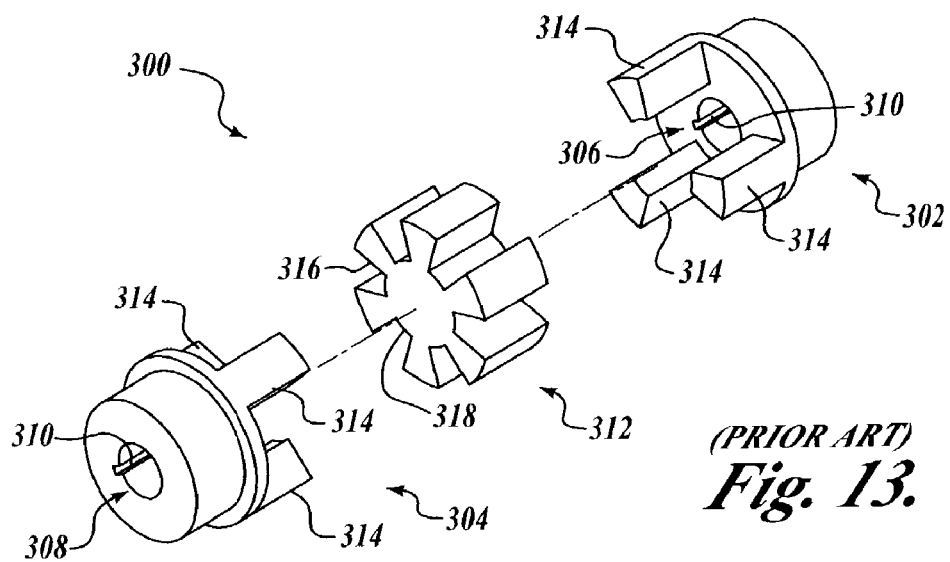
Figure 14:
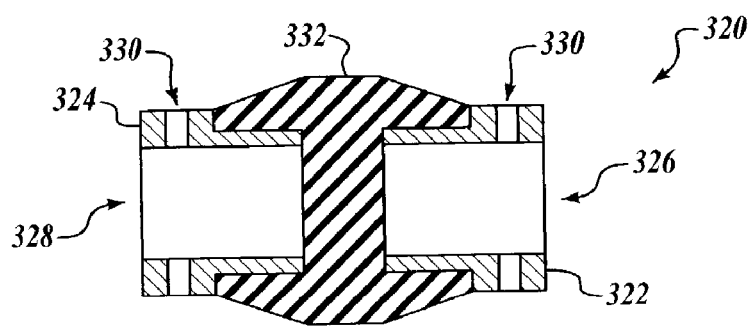

Other examples include the different flexible couplers that are alternatively used as the coupler assembly or coupling means 116 are illustrated in FIGS. 13, 14 and 15.

FIG. 13 is an expanded view illustrating a known flexible elastomeric compression type coupling 300 that is useful as the coupler assembly or coupling means 116 for coupling the power input shaft 117 of the vacuum blower 106 in a flexible, rotationally fixed contact to the power output shaft 115 of the power plant 104. The flexible elastomeric compression type coupling 300 includes a two metal hubs 302, 304 structure for rotationally fixed connection to the power output and power input shafts 115, 117. For example, the metal hubs 302, 304 each include a respective through bore 306, 308 sized to accept the respective power output and power input shafts 115, 117; each of the through bore 306, 308 having a keyway 310 structured to mate with keyways formed in the respective power output and power input shafts 115, 117, whereby a pair of keys interlock the hubs 302, 304 to the respective shafts 115, 117. The hubs 302, 304 are structured to interlock through an intermediate flexible elastomeric connector 312. The hubs 302, 304 each include fingers 314 projecting along the axis of the respective power output and power input shafts 115, 117, and the intermediate elastomeric connector 312 includes a quantity of mating fingers 316 radiating radially from a solid core 318. The fingers 316 of the intermediate elastomeric connector 312 are structured such that they fill spaces between the hub fingers 314 under compression when the two hubs 302, 304 are relatively rotated and brought together. The flexible elastomeric compression type coupling 300 loads the intermediate elastomeric connector 312 in compression and permits reasonable shaft misalignment, but is recommended for light loads only.

FIG. 14 illustrates another known flexible elastomeric shear-type coupling 320 that is useful as the coupler assembly or coupling means 116 for coupling the power input shaft 117 of the vacuum blower 106 in a flexible, rotationally fixed contact to the power output shaft 115 of the power plant 104, The elastomeric coupling 320 includes a two metal hubs 322, 324 structure for rotationally fixed connection to the power output and power input shafts 115, 117. For example, the metal hubs 322, 324 each include a respective through bore 326, 328 sized to accept the respective power output and power input shafts 115, 117; each of the through bore 326, 328 having a pin hole 330 structured to mate with pin holes formed in the respective power output and power input shafts 115, 117, whereby a pair of pins interlock the hubs 322, 324 to the respective shafts 115, 117. Alternatively, holes 330 are threaded for accepting set screws whereby the respective power output and power input shafts 115, 117 are clamped relative to the hubs 322, 324. The hubs 322, 324 are structured to interlock through an intermediate flexible elastomeric connector 332 that is molded, adhesively bonded or otherwise adhered to an outer diameter of each of the hubs 322, 324, the intermediate elastomeric connector 332 thereby joining the two hubs 322, 324 with their respective bores 326, 328 being relatively axially aligned. The flexible elastomeric coupling 320 transmits torque between the hubs 322, 324 through the intermediate elastomeric connector 332 acting in shear, which permits reasonable shaft misalignment.

Figure 15A:
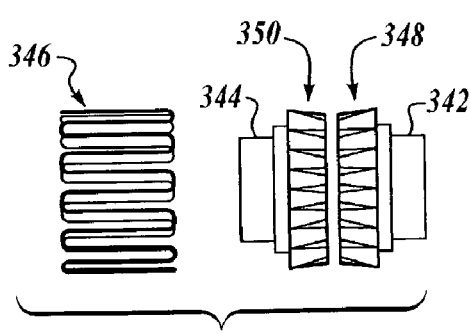
Figure 15B:
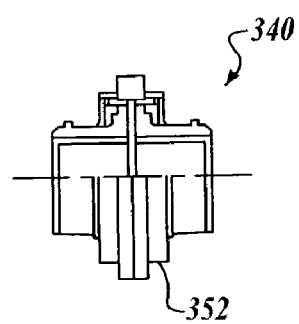

FIG. 15A is an expanded view and FIG. 15B is an assembly view that together illustrate the known Steelflex coupling 340 having two grooved steel hubs 342, 344 respective bores of which are keyed to respective power output and input shafts 115, 117. Connection between the two hubs 342, 344 is secured by a specially tempered alloy-steel member 346 called the "grid." The grid 346 interconnects between grooves 348, 350 cut in the respective steel hubs 342, 344. The bore of a casing or sleeve 352 that maintains the interconnection.

While the preferred embodiment of the invention has been illustrated and described, it will be appreciated that various changes can be made therein without departing from the spirit and scope of the invention.

What is claimed is:

1. An interface assembly for interconnecting respective housings and output and input drive shafts of a power plant and a vacuum blower by hard mounting, the interface assembly comprising:
   an adapter plate secured to a housing of the power plant in rigid and rotationally fixed contact therewith at an output drive shaft thereof;
   a rigid metal casting interfaced to the adapter plate on the power plant in rigid and rotationally fixed contact therewith, the rigid metal casting further interfaced to a housing of the vacuum blower in rigid and rotationally fixed contact therewith at an input drive shaft thereof; and
   a coupler assembly interfaced in rotationally fixed contact to each of the output and input drive shafts for transferring power from the power plant output drive shaft to the vacuum blower input drive shaft.

2. The interface assembly of claim 1 where in the coupler assembly further comprises a rigid coupler assembly interfaced in rigid and rotationally fixed contact to each of the output and input drive shafts.

3. The interface assembly of claim 1 wherein the coupler assembly further comprises:
   a flywheel assembly interfaced in rigid and rotationally fixed contact to the output drive shaft of the power plant; and
   a rigid coupling interfaced in rigid and rotationally fixed contact between the flywheel assembly and the input drive shaft of the vacuum blower.

4. The interface assembly of claim 3 where in the a rigid coupler assembly further comprises C-face coupler.

5. The interface assembly of claim 3 wherein the coupler assembly further comprises a metal spline.

6. The interface assembly of claim 1, further comprising a plurality of precision alignment pins and matching precision guide holes established between the metal casting and the adapter plate.

7. The interface assembly of claim 1, further comprising a plurality of precision alignment pins and matching precision guide holes established between the metal casting and the housing of the vacuum blower.

8. The interface assembly of claim 1, further comprising a structurally reinforced face plate in rigid and rotationally fixed contact with the vacuum blower at the input drive shaft thereof and the rigid metal casting being interfaced thereto.

9. The interface assembly of claim 1 wherein the coupler assembly further comprises a flexible coupling.

10. The interface assembly of claim 9 wherein the flexible coupling further comprises a flexible Waldron-type coupling.

11. The interface assembly of claim 9 wherein the flexible coupling further comprises a shear-type elastomeric coupling.

12. The interface assembly of claim 9 wherein the flexible coupling further comprises a compression-type elastomeric coupling.

13. An interface assembly for coupling a vacuum blower to a power plant in a drive system, the interface assembly comprising:
   an adapter plate secured to the power plant adjacent to a power output shaft thereof;
   a substantially rigid coupling rotationally secured in contact with both of the power output shaft of the power plant and a power input shaft of the vacuum blower; and
   a rigid bell housing coupled between the adapter plate and the vacuum blower adjacent to the power input shaft thereof, the bell housing structured to cooperate with each of the adapter plate and the vacuum blower to coaxially align the power input shaft of the vacuum blower and the power output shaft of the power plant.

14. The interface assembly of claim 13 wherein the contact of the coupling with both of the power output shaft of the power plant and a power input shaft of the vacuum blower further comprises a metal-to-metal contact.

15. The interface assembly of claim 14 wherein the coupling further comprises a C-face coupling.

16. The interface assembly of claim 13 wherein the rigid coupling further comprises:
   a flywheel assembly having a power input surface rotationally secured to the power output shaft of the power plant external to the adapter plate and having a power output surface, and
   a rigid metal-to-metal coupling having a power input surface rotationally secured between the output surface of the flywheel assembly and the power input shaft of the vacuum blower for transmitting power thereto in the form of torque.

17. The interface assembly of claim 16 wherein the rigid bell housing further comprises first and second opposing surfaces coupled to space the adapter plate and the vacuum blower a distance for rotationally securing the rigid coupling in metal-to-metal contact with both of the output surface of the flywheel assembly and the power input shaft of the vacuum blower.

18. The interface assembly of claim 16 wherein the output surface of the flywheel assembly further comprises an internal spline, and the rigid metal-to-metal coupling further comprises an external spline structured to cooperate with the internal spline of the flywheel assembly.

19. The interface assembly of claim 16, further comprises:
   a power plant having the adapter plate secured thereto and having a power output shaft; and
   a vacuum blower having the bell housing secured thereto and having a power input shaft.

20. The interface assembly of claim 19 wherein the vacuum blower further comprises a structurally reinforced face plate having the power input shaft passing therethrough and having the bell housing secured thereto.

21. The interface assembly of claim 13 wherein the coupling further comprises a flexible Waldron-type coupling.

22. The interface assembly of claim 13 wherein the coupling further comprises a pair of coaxial metal hubs structured to interconnect to the output and input drive shafts in a rotationally fixed manner, each of the metal hubs having a plurality of axially projecting fingers and an elastomeric connector intermediate the metal hubs and having a plurality of radially projecting fingers structured to fill spaces between the axially projecting hub fingers under compression when the two hubs are relatively rotated and intermeshed therewith.

23. The interface assembly of claim 13 wherein the coupling further comprises two coaxial hubs structured to interconnect to the output and input drive shafts in a rotationally fixed manner and being interconnected in a rotationally fixed manner by an intermediate elastomeric connector.

24. An interface assembly for coupling a vacuum blower to a power plant in a drive system, the interface assembly comprising:
   an adapter plate secured to the power plant adjacent to a power output shaft thereof;
   a substantially rigid coupling rotationally secured in contact with both of the power output shaft of the power plant and a power input shaft of the vacuum blower, the rigid coupling further comprising:
      (a) a flywheel assembly having a power input surface rotationally secured to the power output shaft of the power plant external to the adapter plate and having a power output surface, the flywheel assembly comprising a flywheel having the power input surface rotationally secured in metal-to-metal contact to the power output shaft of the power plant and having a power output surface, and a coupling hub rotationally and angularly fixed to the power output surface of the flywheel and having a power output surface, and
      (b) a rigid metal-to-metal coupling having a power input surface rotationally secured between the output surface of the flywheel assembly and the power input shaft of the vacuum blower for transmitting power thereto in the form of torque; and
   a rigid bell housing coupled between the adapter plate and the vacuum blower adjacent to the power input shaft thereof, the bell housing structured to cooperate with each of the adapter plate and the vacuum blower to coaxially align the power input shaft of the vacuum blower and the power output shaft of the power plant.

25. The interface assembly of claim 24 wherein the coupling hub further comprises a power input surface; and
   further comprising an annular metal plate rotationally and angularly fixed in metal-to-metal contact to the power output surface of the flywheel and having a power output surface rotationally and angularly fixed in metal-to-metal contact to the power input surface of the coupling hub.

26. An interface assembly for coupling a vacuum blower to a power plant in a drive system, the interface assembly comprising:
   an adapter plate secured to the power plant adjacent to a power output shaft thereof;
   a substantially rigid coupling rotationally secured in contact with both of the power output shaft of the power plant and a power input shaft of the vacuum blower, the rigid coupling further comprising:
      (a) a flywheel assembly having a power input surface rotationally secured to the power output shaft of the power plant external to the adapter plate and having a power output surface, and
      (b) a rigid metal-to-metal coupling having a power input surface rotationally secured between the output surface of the flywheel assembly and the power input shaft of the vacuum blower for transmitting power thereto in the form of torque; and
   a rigid bell housing coupled between the adapter plate and the vacuum blower adjacent to the power input shaft thereof, the bell housing structured to cooperate with each of the adapter plate and the vacuum blower to coaxially align the power input shaft of the vacuum blower and the power output shaft of the power plant, the bell housing comprising one or more precision guide pins, and the vacuum blower further comprises one or more precision guide holes structured to cooperate with the one or more precision guide pins to coaxially align the power input shaft of the vacuum blower and the power output shaft of the power plant.

27. An interface assembly for coupling a vacuum blower to a power plant in a drive system, the interface assembly comprising:
   an adapter plate secured to the power plant adjacent to a power output shaft thereof;
   a substantially rigid coupling rotationally secured in contact with both of the power output shaft of the power plant and a power input shaft of the vacuum blower, the rigid coupling further comprising:
      (a) a flywheel assembly having a power input surface rotationally secured to the power output shaft of the power plant external to the adapter plate and having a power output surface, and
      (b) a rigid metal-to-metal coupling having a power input surface rotationally secured between the output surface of the flywheel assembly and the power input shaft of the vacuum blower for transmitting power thereto in the form of torque; and
   a rigid bell housing coupled between the adapter plate and the vacuum blower adjacent to the power input shaft thereof, the bell housing structured to cooperate with each of the adapter plate and the vacuum blower to coaxially align the power input shaft of the vacuum blower and the power output shaft of the power plant, the bell housing comprising one or more precision guide pins, and the adapter plate further comprises one or more precision guide holes structured to cooperate with the one or more precision guide pins to coaxially align the power input shaft of the vacuum blower and the power output shaft of the power plant.

28. A cleaning system having a drive system mounted on a structural frame and coupled for generating vacuum in a water recovery tank, a high pressure solution hose between a supply of heated and pressurized water based chemical cleaning solution and a delivery wand for providing the cleaning solution to a target surface, and a vacuum hose for recovering previously delivered cleaning solution from the target surface using the vacuum generated by the drive system, wherein the drive system includes a torque generator having a torque output shaft and a vacuum generator having a torque input shaft, a rigid metal-to-metal interface assembly coupled for transmitting torque from the torque output shaft of the torque generator to the torque input shaft of the vacuum generator, the interface assembly comprising:
   an adapter plate secured to the torque generator relative to the torque output shaft;
   a robust structural connector secured to the adapter plate of the torque generator and to the vacuum generator relative to the torque input shaft, the structural connector being structured to rigidly coaxially align the torque input shaft of the vacuum generator and the torque output shaft of the torque generator and being sized to space an end face of the torque input shaft in proximity to a torque output surface of the flywheel assembly; and
   a coupling interconnected between the torque output shaft of the torque generator and the torque input shaft for transmitting torque from the torque output shaft of the torque generator to the torque input shaft of the vacuum generator.

29. The cleaning system of claim 28, wherein the coupling further comprises a substantially inflexible coupling.

30. The cleaning system of claim 29 where in the a rigid coupler assembly further comprises C-face coupler.

31. The interface assembly of claim 29 wherein the substantially inflexible coupling coupled between the torque output face of the flywheel assembly and the torque input shaft of the vacuum generator is further coupled in substantially inflexible metal-to-metal contact with each of the torque output surface of the flywheel assembly and the torque input shaft.

32. The interface assembly of claim 31 wherein the substantially inflexible coupling and the torque output face of the flywheel assembly further comprise intermeshed splines.

33. The interface assembly of claim 31 wherein the torque input shaft of the vacuum generator further comprises a first keyway, the substantially inflexible coupling further comprises a cooperating second keyway, and further comprising a key inserted between the first and second keyways.

34. The cleaning system of claim 28, further comprising a flywheel assembly secured to the torque output shaft of the torque generator; and
   wherein the coupling is interconnected between the torque output shaft of the torque generator surface of the flywheel assembly and the torque input shaft for transmitting torque from the flywheel assembly to the torque input shaft of the vacuum generator.

35. The cleaning system of claim 28 wherein the coupler assembly further comprises a flexible coupling.

36. The cleaning system of claim 35 wherein the flexible coupling further comprises a Waldron-type elastomeric coupling.

37. The cleaning system of claim 35 wherein the flexible coupling further comprises a shear-type elastomeric coupling.

38. The cleaning system of claim 35 wherein the flexible coupling further comprises a compression-type elastomeric coupling.

39. The interface assembly of claim 28, further comprising a plurality of guides operating between the structural connector and the adapter plate for coaxially aligning the torque input shaft of the vacuum generator and the torque output shaft of the torque generator.

40. An industrial substrate cleaning system having a means for delivering heated and pressurized water based chemical cleaning solution to a target substrate, and a means for recovering previously delivered cleaning solution from the target substrate using vacuum, and a drive means, wherein the drive means includes a torque generating means having a torque outputting means, and a vacuum generating means having a torque inputting means, and a means for interfacing the torque inputting means of the vacuum generating means to the torque outputting means of the torque generating means, the interfacing means comprising:
   a means for substantially inflexibly coupling the vacuum generating means and the torque generating means in a single structural unit;
   a means for substantially inflexibly coaxially aligning the torque inputting means of the vacuum generating means with the torque outputting means of the torque generating means;
   a means for maintaining the substantially inflexibly coaxial alignment of the torque inputting means of the vacuum generating means and the torque outputting means of the torque generating means; and a means for substantially rotationally fixing the torque inputting means of the vacuum generating means with the torque outputting means of the torque generating means for transmitting torque from the torque outputting means of the torque generating means to the torque inputting means of the vacuum generating means.

41. The industrial substrate cleaning system of claim 40 wherein the rotationally fixing means further comprises means for inflexibly coupling the torque inputting means of the vacuum generating means in metal-to-metal contact with the torque outputting means of the torque generating means.

42. The industrial substrate cleaning system of claim 40 wherein the coaxially aligning means further comprises a means for guiding the vacuum generating means into metal-to-metal contact with the torque generating means.

43. The industrial substrate cleaning system of claim 40 wherein the means for coupling the vacuum generating means and the torque generating means in a single structural unit further comprises the coaxially aligning means and the rotationally fixing means.

44. A professional substrate cleaning system having a means for delivering heated and pressurized water based chemical cleaning solution to a target surface, and a means for recovering previously delivered cleaning solution from the target surface using vacuum, and a drive means, wherein the drive means includes a torque generating means having a torque outputting means, and a vacuum generating means having a torque inputting means, and a method for interfacing the torque inputting means of the vacuum generating means to the torque outputting means of the torque generating means, the interfacing method comprising:

coupling the vacuum generating means and the torque generating means in a single structural unit;

coaxially aligning the torque inputting means of the vacuum generating means with the torque outputting means of the torque generating means;

rigidly maintaining the coaxial alignment of the torque inputting means of the vacuum generating means and the torque; and rigidly rotationally fixing the torque inputting means of the vacuum generating means substantially inflexibly to the torque outputting means of the torque generating means for transmitting torque from the torque outputting means of the torque generating means to the torque inputting means of the vacuum generating means.

45. The method of claim 44 wherein rotationally fixing further comprises inflexibly coupling the torque inputting means of the vacuum generating means in metal-to-metal contact with the torque outputting means of the torque generating means.

46. The method of claim 44 wherein coupling the vacuum generating means and the torque generating means in a single structural unit further comprises both coaxially aligning the torque inputting means of the vacuum generating means with the torque outputting means of the torque generating means and and rotationally fixing the torque inputting means of the vacuum generating means substantially inflexibly to the torque outputting means of the torque generating means.

47. The method of claim 46 wherein coupling the vacuum generating means and the torque generating means in a single structural unit further comprises guiding the vacuum generating means into metal-to-metal contact with the torque generating means.

48. The method of claim 44 wherein coaxially aligning further comprises guiding the vacuum generating means into metal-to-metal contact with the torque generating means.

49. An industrial carpet cleaning system having a drive system mounted on a structural frame and coupled for generating vacuum in a water recovery tank, a high pressure solution hose between a supply of heated and pressurized water-based chemical cleaning solution and a delivery wand for providing the cleaning solution to a target surface, and a vacuum hose for recovering previously delivered cleaning solution from the target surface using the vacuum generated by the drive system, the drive system comprising:

a power plant having a power output shaft;

a vacuum blower having a power input shaft and a face plate adjacent to the power input shaft;

a interface assembly coupled in mutual contact between the output shaft of the power plant and the input shaft of the vacuum blower, the interface assembly comprising:

an adapter plate securely fastened to the power plant adjacent to the power output shaft, a flywheel assembly securely fastened to the power output shaft of the power plant and having a power output surface positioned external to the adapter plate, a coupling securely fastened between the output surface of the flywheel assembly and the power input shaft for transmitting power from the flywheel assembly to the power input shaft of the vacuum blower, and a rigid structural connector securely fastened between the adapter plate and the face plate of the vacuum blower, the structural connector being structured to coaxially align the power input shaft of the vacuum blower with the power output shaft of the power plant.

50. The system of claim 49 wherein the contact between the interface assembly and at least one of the output shaft of the power plant and the input shaft of the vacuum blower further comprises a metal-to-metal interface.

51. The system of claim 49 wherein the contact between the interface assembly and each of the output shaft of the power plant and the input shaft of the vacuum blower further comprises a metal-to-metal interface.

52. The system of claim 49 wherein the coupling further comprises a substantially inflexible coupling.

53. The system of claim 52 wherein the power input shaft of the vacuum blower further comprises a first keyway, the substantially inflexible coupling further comprises a cooperating second keyway, and further comprising a key inserted between the first and second keyways.

54. The system of claim 52 wherein the substantially inflexible coupling further comprises a metal-to-metal coupling in contact with each of the power output surface of the flywheel assembly and the power input shaft.

55. The system of claim 52 wherein the power output surface of the flywheel assembly further comprises a first spline, and the substantially inflexible coupling further comprises a power input surface structured as a second intermeshing spline.

56. The system of claim 49 wherein the interface assembly further comprises a substantially rigid interface assembly.

57. The system of claim 49 where in the coupling further comprises C-face coupler.

58. The system of claim 49 wherein the coupling further comprises an elastomeric coupling.

59. The system of claim 49 wherein the coupling further comprises a Waldron-type coupling.

60. The system of claim 49, further comprising a plurality of precision guide pins and cooperating precision guide holes operating between the structural connector and the adapter plate, the guide pins-and cooperating guide holes being positioned to coaxially align the power input shaft of the vacuum generator with the power output shaft of the power plant.

61. The system of claim 60, further comprising a second plurality of precision guide pins and cooperating precision guide holes operating between the structural connector and the face plate of the power plant.

62. A slide-in industrial substrate cleaning system, comprising:
 a) a structural platform;
 b) a structurally integral drive system mounted on the structural platform, the drive system having:
  i) a power plant having a power output shaft,
  ii) a vacuum blower having a power input shaft, and
  iii) an interface assembly for transmitting power from the power plant to the vacuum blower, the interface assembly comprising:
   1) a coupling having a power input surface coupled in rotationally and angularly fixed contact with the power output shaft of the power plant, and having an output surface coupled in rotationally and angularly fixed metal-to-metal contact with the power input shaft of the vacuum blower,
   2) an adapter plate coupled in rotationally and angularly fixed metal-to-metal contact with the power plant,
   3) a rigid bell housing coupled in rotationally and angularly fixed contact with both the adapter plate and the vacuum blower,
   4) a first plurality of precision pins and mating precision holes operating between the bell housing and the adapter plate, and
   5) a second plurality of precision pins and mating precision holes operating between the bell housing and the vacuum blower;
 c) one or more heat exchangers and associated plumbing for heating pressurized water;
 d) a chemical container coupled for delivering a stream of cleaning chemical into hot water;
 e) a wand for dispersing and removing hot water and cleaning solution to a surface to be cleaned;
 f) a high pressure solution hose coupled for delivering hot water and cleaning solution to the wand;
 g) a vacuum hose coupled to the wand for removing hot water and cleaning solution from the surface; and
 h) a recovery tank coupled to the vacuum hose for storing the hot water and cleaning solution removed from the surface.

63. The system of claim 62 wherein the coupling further comprises a substantially rigid coupling.

64. The system of claim 62 wherein the contact of the coupling with the power output shaft of the power plant further comprises a metal-to-metal contact.

65. The system of claim 62 wherein the contact of the coupling with the power input shaft of the vacuum blower further comprises a metal-to-metal contact.

66. The system of claim 62 wherein the coupling further comprises a substantially rigid coupling.

67. The system of claim 66 wherein the coupling further comprises:
 a power output surface; and
 a hub rotationally and angularly fixed between the power output surface of the rigid coupling and the power input shaft of the vacuum blower.

68. The system of claim 67 wherein the rigid coupling further comprises a flywheel assembly having both the power input surface and the power output surface of the coupling.

69. The system of claim 67 wherein:
 the power output surface of the coupling further comprises a spline portion; and
 the hub further comprises a spline structured to intermesh with the spline portion of the power output surface of the coupling.

70. The system of claim 62 wherein the coupling further comprises a substantially flexible coupling.

71. The system of claim 70 wherein the flexible coupling further comprises one of a Waldron-type coupling, a shear-type elastomeric coupling, and a compression-type elastomeric coupling.

72. The system of claim 68 wherein the flywheel assembly further comprises:
 a flywheel having the power input surface coupled to the power output shaft of the power plant;
 an annular plate coupled in rotationally and angularly fixed contact with the flywheel;
 a coupling hub coupled in angularly fixed contact with the annular plate and having the power output surface of the coupling.

73. The system of claim 72 wherein the flywheel assembly further comprises:
 a plurality of fasteners angularly fixing the coupling hub in contact with the annular plate; and
 an elastomeric insert between each of the fasteners and the coupling hub.

74. A method for carpet cleaning, the method comprising:
 a) a structurally integrating a drive system on a structural platform, including structurally integrating:
  i) a power plant structured for outputting power via an output shaft,
  ii) a vacuum blower structured for intaking power via an input shaft,
  iii) a structural interface assembly rigidly coupled between the vacuum blower and the power plant, the structural interface assembly being structured for rigidly coaxially aligning the vacuum blower input shaft with the power plant output shaft, and
  iv) a power transmission interface assembly rigidly coupled between the power plant output shaft and the vacuum blower input shaft, the power transmission interface assembly being structured for transmitting power from the power plant output shaft to the vacuum blower input shaft;
 b) operating the drive system for driving a pressurizer for pressurizing;
 c) operating the drive system for driving a heater for heating water;
 c) delivering a cleaning chemical into the water;
 d) dispersing hot water and cleaning solution to a surface to be cleaned; and
 e) operating the drive system for generating a vacuum for removing the hot water and cleaning solution from the surface.

75. The method of claim 74 wherein structurally integrating the power transmission interface for transmitting power from the power plant to the vacuum blower, further comprises structurally integrating a substantially inflexible power transmission interface assembly.

76. The method of claim 74 wherein structurally integrating the power transmission interface for transmitting power from the power plant to the vacuum blower, further comprises structurally integrating a substantially flexible power transmission interface assembly.

77. The method of claim 74 wherein operating the drive system for generating a vacuum further comprises generating a vacuum in a recovery tank, and further comprising removing the hot water and cleaning solution to the recovery tank.

78. A method for carpet cleaning, the method comprising:
a) a structurally integrating a drive system on a structural platform, including structurally integrating:
   i) a power plant structured for outputting power via an output shaft,
   ii) a vacuum blower structured for intaking power via an input shaft,
   iii) a structural interface assembly structured for rigidly coaxially aligning the vacuum blower input shaft with the power plant output shaft by:
      1) rotationally and angularly fixing an adapter plate in contact with the power plant,
      2) coupling a rigid bell housing in rigid rotationally and angularly fixed contact with both the adapter plate and the vacuum blower,
      3) interfacing a first plurality of precision pins and mating precision holes between the bell housing and the adapter plate, and
      4) interfacing a second plurality of precision pins and mating precision holes between the bell housing and the vacuum blower; and
   iv) a power transmission interface assembly structured for transmitting power from the power plant to the vacuum blower by:
      1) rigidly coupling a power input surface of the power transmission interface assembly in rotationally and angularly fixed contact with the output shaft of the power plant; and
      2) rigidly coupling a power output surface of the power transmission interface assembly in rotationally and angularly fixed contact with the input shaft of the vacuum blower;
b) operating the drive system for driving a pressurizer for pressurizing;
c) operating the drive system for driving a heater for heating water;
c) delivering a cleaning chemical into the water;
d) dispersing hot water and cleaning solution to a surface to be cleaned; and
e) operating the drive system for generating a vacuum for removing the hot water and cleaning solution from the surface.

79. The method of claim 78 wherein coupling a power input surface of the interface assembly in rigid rotationally and angularly fixed contact with the output shaft of the power plant, further comprises coupling a power input surface of the interface assembly in metal-to-metal contact with the output shaft of the power plant.

80. The method of claim 78 wherein coupling a power output surface of the interface assembly in rotationally and angularly fixed contact with the input shaft of the vacuum blower, further comprises coupling a power output surface of the interface assembly in metal-to-metal contact with the input shaft of the vacuum blower.

81. The method of claim 78, further comprising intermeshing mating splines between the input and output surfaces of the interface assembly.

* * * * *